United States Patent
Shum et al.

(10) Patent No.: US 7,039,216 B2
(45) Date of Patent: *May 2, 2006

(54) AUTOMATIC SKETCH GENERATION

(75) Inventors: Heung-Yeung Shum, Beijing (CN); Ying-Qing Xu, Beijing (CN); Hong Chen, Beijing (CN)

(73) Assignee: Microsoft Corporation, Redmond, WA (US)

(*) Notice: Subject to any disclaimer, the term of this patent is extended or adjusted under 35 U.S.C. 154(b) by 1 day.

This patent is subject to a terminal disclaimer.

(21) Appl. No.: 10/997,401

(22) Filed: Nov. 24, 2004

(65) Prior Publication Data

US 2005/0100243 A1    May 12, 2005

Related U.S. Application Data

(63) Continuation of application No. 09/996,323, filed on Nov. 19, 2001, now Pat. No. 6,845,171.

(51) Int. Cl.
    *G06K 9/00* (2006.01)
(52) U.S. Cl. .............. 382/100; 382/203; 382/293
(58) Field of Classification Search ............ 382/100, 382/118, 190, 202, 203, 201, 215, 293
See application file for complete search history.

(56) References Cited

U.S. PATENT DOCUMENTS

| | | | | |
|---|---|---|---|---|
| 5,375,195 A | * | 12/1994 | Johnston | 345/630 |
| 6,385,628 B1 | * | 5/2002 | Massarsky | 715/502 |
| 6,619,860 B1 | * | 9/2003 | Simon | 382/277 |

* cited by examiner

*Primary Examiner*—Vikkram Bali
*Assistant Examiner*—Wes Tucker
(74) *Attorney, Agent, or Firm*—Lyon & Harr, LLP; Richard T. Lyon

(57) ABSTRACT

An example-based facial sketch system and process that automatically generates a sketch from an input image depicting a person's face. Sketch generation is accomplished by first training the system using example facial images and sketches of the depicted faces drawn with a particular style by a sketch artist. The trained system is then used to automatically generate a facial sketch that simulates the artist's style from an input image depicting a person's face. Nonparametric sampling and a flexible sketch model are employed to capture the complex statistical characteristics between an image and its sketch.

6 Claims, 18 Drawing Sheets

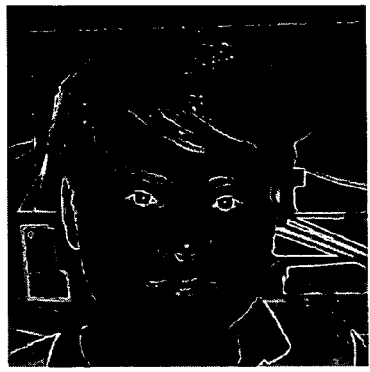
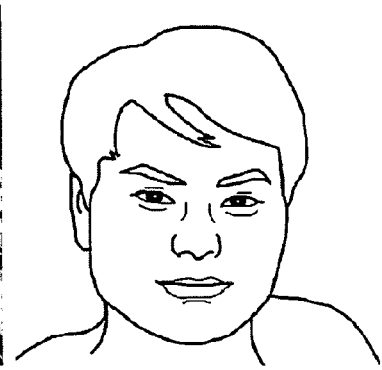
FIG. 3A          FIG. 3B          FIG. 3C
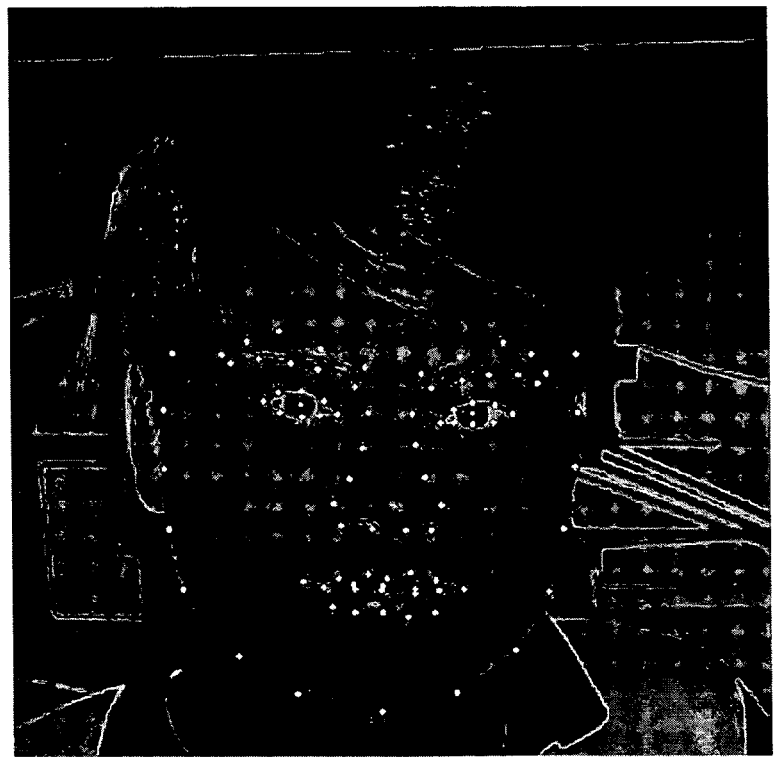
FIG. 6

|  | Example 1 | Example 2 | Example 3 |
|---|---|---|---|
| *I'* | | | |
| *S'* | | | |
| *N=3\*3* | | | |
| *N=7\*7* | | | |
| *N=11\*11* | | | |
| *N=15\*15* | | | |

FIG. 15

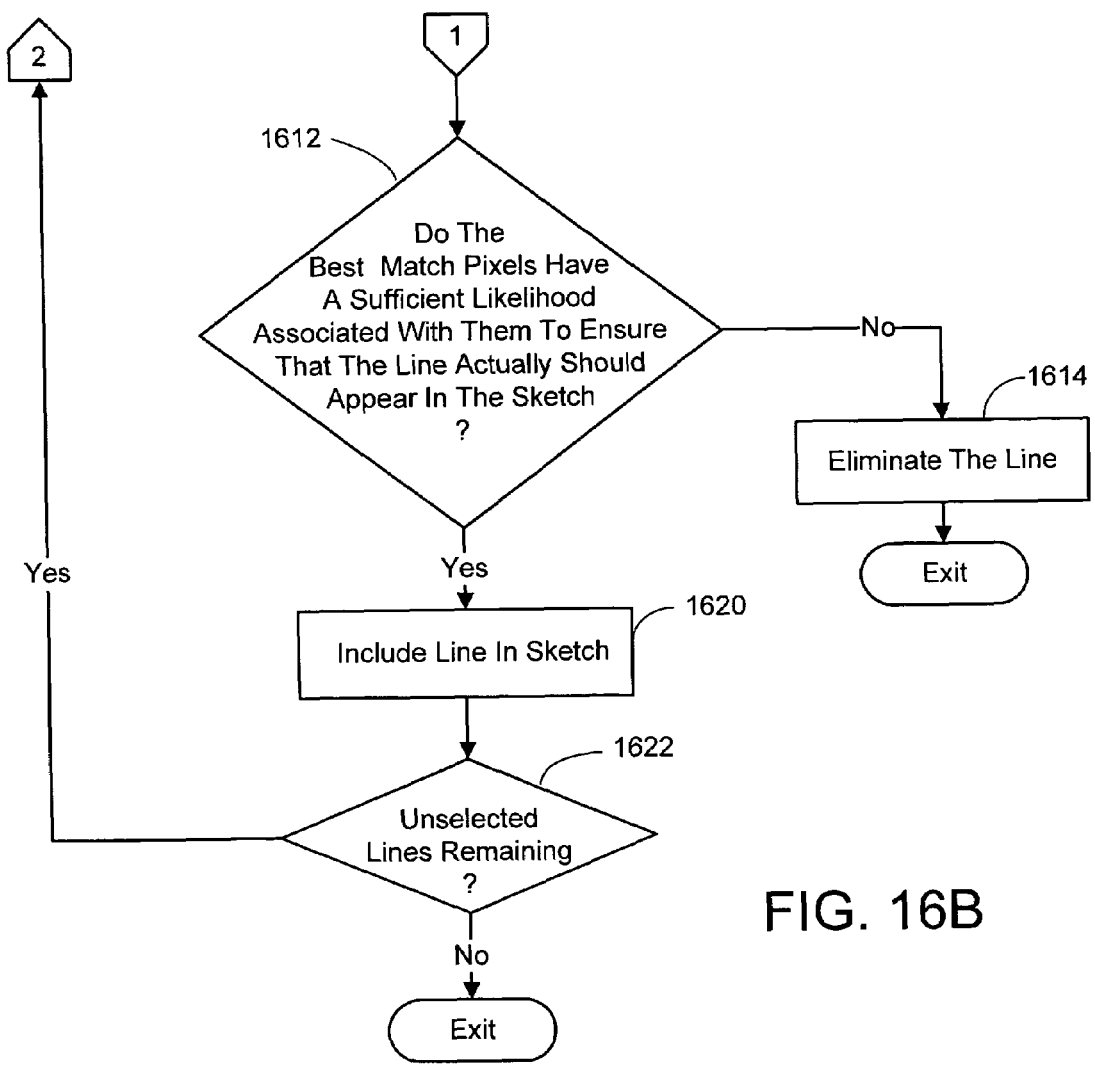

AUTOMATIC SKETCH GENERATION

CROSS-REFERENCE TO RELATED APPLICATIONS

This application is a continuation of a prior application entitled "AUTOMATIC SKETCH GENERATION" which was assigned Ser. No. 09/996,323 and filed Nov. 19, 2001 now U. S. Pat. No. 6,845,171.

BACKGROUND

1. Technical Field

The invention is related to example-based facial sketch generation, and more particularly to a system and process for automatically generating a sketch of a person's face from an image of the person's face that captures the style of a sketch artist whose facial sketches were employed in training the system.

2. Background Art

It is always fascinating to see how a sketch artist draws a picture of someone's face. Sketches are perhaps the simplest form of drawings because they consist of only lines. Somehow the artist can quickly distill the identifying characteristics of a face and highlight them with a small number of strokes.

There have been a few attempts to interactively or automatically synthesize facial sketches. Brennan [1] presented perhaps the first interactive caricature generator. Murakami et al. [2, 3] developed the template-based facial caricature system. Li et al. [4] proposed an automatic facial sketch system that uses a generalized symmetry operator, rectangle filter, and characteristic shapes to detect the locations of facial feature points. However, these approaches, without observing and learning from the artist's products, in general produce stiff and unexpressive sketches.

There have been some attempts to teach a computer to automatically generate a stylistic facial sketch by observing images drawn by artists. For example, Librande [5] developed an example-based character drawing system that can generate many dramatic sketches but is restricted in the types of images it can manipulate. Recently, Freeman et al [6] presented an example-based system for translating a sketch into different styles. However, this system focused on transferring styles instead of generating a stylistic sketch from an image.

No system to date has provided an example-based stylistic facial sketch system that is capable of capturing the subtle styles of a sketch artist's work, and use this information to automatically generate a sketch that exhibits the stylistic characteristics of the sketch artist. The present invention is the first to accomplish this task.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for automatically generating sketch images from images of a person. This generally involves two phases—namely a training phase and a runtime phase. The training phase employs example images and corresponding sketches of peoples' faces to teach the system to generate sketches reflecting the style of the example sketches. The runtime phase generates a sketch of a person depicted in an input image with the resulting sketch exhibiting the stylistic characteristics of the sketch artist who created the example sketches.

The training phase of the present system and process begins with inputting a set of training images. Each training image is a frontal view of a person's face that has been scaled and cropped to exhibit a consistent size and centering. A sketch of the person depicted in each of the training images is produced manually by a "sketch artist". These sketches become training sketches. The lines making up these sketches are made to correspond to the locations of the features they represent in training images. In this respect, the training sketches are not exaggerations or caricatures of the depicted person's face.

In addition to creating a sketch from each of the training images, a prescribed set of feature points is also labeled in each image. This involves manually identifying feature points in a training image and then saving the locations of these points. In tested embodiments of the present invention this was done according to a set of rules by which the endpoints of prescribed face features are identified and then a prescribed number of equidistant points between the endpoints along the contour of the particular feature are also identified. The locations of the identified points in the training image are saved and represent the labeled feature points associated with that image. The labeled feature points are used to define an average face shape associated with the set of training images. This is accomplished by first creating a shape vector from the labeled feature points of each training image, respectively. The vector elements can be in any order desired, as long as the same order is used for each shape vector. The shape vectors are averaged by averaging each corresponding vector element among the vectors to produce a single vector, which will hereafter be referred to as the "MeanShape" vector. This MeanShape vector represents the average location of each corresponding feature point.

The MeanShape vector is used to define a set of geometric transform functions—one for each training image. Each transform function is essentially a flow field, which when combined with the shape vector associated with the function's training image produces the MeanShape vector. The respective geometric transform functions are used to warp their associated training image and the sketch corresponding to that training image into what will be referred to as a transformed training image and sketch. This warping essentially uses the flow field to reassign the pixel location of each pixel in the training images and sketches. For pixels not coinciding with one of the feature points, conventional interpolative methods are employed to establish their new location in the averaged image or sketch.

The aforementioned shape vectors are also used to train a conventional Active Shape Model (ASM) module. Essentially, the ASM module will be used to automatically identify feature points in input images from which a sketch is to be produced. Thus, in the runtime phase of the present sketch generator system and process, the feature points will not have to be manually labeled as with the training images.

The training phase is completed by defining a sketch model. As described previously, a sketch is made up of a plurality of line segments. The sketch model is constructed to model the style of the sketch artist by including the particular line segments typically found in sketches produced by the artist as exemplified in the training sketches. Generally, this is accomplished by using the training sketches to decide what lines are to be included in the sketch model. The position of each included line is established using control points that define both the shape and location of the line. In tested embodiments of the present invention, the foregoing process of defining the sketch model involved representing the sketch model as a set containing a fixed number of lines, each of which is defined by an "on-off switch", its width and a plurality of control point locations. It is decided manually what lines are to be included in the set and should include at least those lines found in most of the training sketches. In addition, each line is defined as being one of three line types. The first line type is one that always appears in every training sketch. The second line type is one which does not appear in every training sketch, but when it does, its appearance is independent of any other line that may or may not appear in the sketch. The final line type is one which appears in the training images only when one or more other lines are present or absent. The line type will ultimately dictate whether a particular line included in the sketch model appears in a sketch generated by the present system and method, as will be discussed later. Essentially, if a modeled line is to appear in a generated sketch the on-off switch element will be set to "on", and if the line is not to appear the switch element will be set to "off". As to the position of an included line in the sketch model, the locations of the control points defining each line in the sketch model are derived from the position of the line in the training sketches.

The runtime phase of the present sketch generation system and process begins with the input of an image depicting a person's face from an approximately frontal view. The previously-trained ASM module is applied to extract a set of feature points from the input image. In addition, a transformed input image is created by forming an input image shape vector from the extracted feature points. The order of the elements of this shape vector mirrors that of the shape vectors formed from the training images. Next, a geometric transform function is established by computing the flow field, which when combined with the input image shape vector, produces the previously-computed MeanShape vector. The geometric transform function is then applied to the input image to create the transformed input image.

A non-parametric sampling process is employed next to produce an expected sketch image. This process generally entails comparing each pixel of the transformed input image to correspondingly located pixels of the transformed training images to find the best match for each training image. Specifically, this is accomplished by selecting a pixel of the transformed input image and identifying its intensity value and that of each of its neighboring pixels in a prescribed-sized neighborhood centered about the selected pixel. In tested embodiments of the present sketch generation system and process a neighborhood size of 7×7 pixels was employed with good results. The intensity values of the pixels in the correspondingly located pixel neighborhood in one of the sample transformed training images are also identified. The difference between the intensity values of the corresponding pixels in the transformed input image and the transformed training image under consideration are computed, and the individual differences are averaged to produce an overall average difference. This same procedure is then repeated for a same sized neighborhood of pixels in the transformed training image surrounding each remaining pixel in a prescribed search block centered on the original corresponding selected pixel location. In tested embodiments of the present invention a typical 5×5 pixel search block was employed. The minimum overall average difference calculated in the foregoing comparison process is identified next, and the pixel residing at the center of the neighborhood of the transformed training image producing this minimum overall average difference is designated as the best match for the transformed input image pixel being considered. The foregoing process is then repeated for each of the remaining transformed training images. Thus, when all the transformed training images have been processed, a pixel in each will have been designated as the best match for the selected pixels in the transformed input image, respectively. It is next determined how likely it is, that the pixel in each transformed training image designated as being the best match to the currently selected pixel of the transformed input image, actually corresponds to the selected pixel. This is done by computing a distribution where the likelihood is based on the relative distance between the location of each of the "best match" pixels and that of the selected pixel of the transformed input image. In addition, it is noted whether the pixel in the transformed sketch associated with each transformed training image, which corresponds in location to a "best match" pixel, is a black or white pixel.

The foregoing procedure is then repeated for each pixel of the transformed input image. Once all the input image pixels have been processed, the aforementioned expected sketch image is generated. This entails integrating the computed distribution. Specifically, for each pixel location in the transformed input image, a prescribed number of the transformed training images corresponding to those having the highest likelihood that the identified "best match" pixel in each of the transformed training images corresponds to the pixel of the transformed input image under consideration, are selected. The number of transformed training images in the selected sample should be enough to mitigate the effects of any noise in the images, while at the same time not be so many that detail is lost in the expected sketch image produced. In tested embodiments of the present sketch generation system and process, it was found a number equaling approximately 25% of the total number of training images produced good results. A weighted average of the sketch pixel values (i.e., either black or white) corresponding to the "best match" pixel of each transformed training image in the selected sample is computed. The contribution of each sketch pixel value to the weighted average is based on the designated likelihood that its corresponding "best match" pixel in the associated transformed training image corresponds to the pixel of the transformed input image under consideration. This process is repeated for each pixel location of the transformed input image, and a resulting weighted average pixel value is assigned to each pixel location, respectively, to generate the expected sketch image. It is noted that the expected sketch image will actually be a gray scale image approximating a sketch.

A best fit procedure is then used to fit the previously-defined sketch model to the expected sketch image. In general, one way of accomplishing this task is to attempt to match lines defined by the sketch model to a corresponding feature in the expected sketch image and then to modify the control point locations of the line so as to fit it to the contour of the identified feature. In doing this, the line type is taken into account. Specifically, for each pixel of a line defined in the sketch model that is of the type that is to always be present in the resulting sketch, the pixel in the expected sketch image that best matches is identified. Any appropriate matching process can be employed. For example, the matching can be accomplished in the same way as described previously in connection with the comparison of the transformed input image to each of the transformed training images. The location of each pixel of the sketch model line under consideration is modified to coincide with the location of the identified "best match" pixel in the expected sketch image. It is then attempted to match those lines designated in the sketch model as sometimes appearing to the expected sketch image. If the line can be matched using the aforementioned comparison and search procedures, then it is incorporated into the sketch being generated. However, if the line cannot be satisfactorily fit to the expected sketch model, it is eliminated in the sketch being generated—i.e., its on-off switch is set to "off" in the aforementioned representation of the line defined by an "on-off switch", its width and a plurality of control point locations. Finally, it is determined if the particular line or lines upon which the inclusion of the third, contingent line type hinges are present or absent as the case may be. If the conditions for inclusion are met, the foregoing comparison and search procedure is employed to fit the contingent lines to the expected sketch image. If the inclusion conditions are not met the line is not included in the sketch and the on-off switch element in the data representation of the line is set to "off". It is noted that the switch element partially defining each line that is to be included in the sketch being generated is set to the "on" condition.

The result of the best fit procedure is a transformed version of a sketch of the face of the person depicted in the input image. The sketch is transformed in that it is produced from a transformed version of the input image. Thus, the final step in generating a sketch from an input image according to the present invention is to eliminate the effects of the warping performed previously to create the transformed input image. This is accomplished by simply applying the inverse of the previously-computed geometric transform function to the transformed sketch. In this way, each pixel in the transformed sketch is reassigned to a location matching that of its corresponding pixel the original input image. The result is a sketch of the face of the person depicted in the input image that exhibits the stylistic characteristics of the sketch artist who created the training sketches.

It is noted that in the tested embodiments of the present invention, the feature points labeled in the training images and those identified via the ASM module in the runtime phase corresponded to features of the depicted person's face only. The subject's hair and ears were excluded. While this need not be the case, it does simplify the processing required to produce a sketch from an input image. When the hair and ears are not modeled, they can be added in once the sketch is generated using conventional edge detection methods on the input image to identify the outline of these features. Lines representing the outline of the hair and ears are then added to the sketch.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 3A–C are images depicting the creation of a training data pair where FIG. 3A is the original training image, FIG. 3B shows a sketch drawn on top of the original training image, and FIG. 3C shows the sketch extracted from the image.

FIG. 6 is an facial training image showing labeled feature points.

FIGS. 7A, C and E respectively show the right eye region of a training image, the sketch of this portion, and the various sketch lines labeled with their control points. FIGS. 7B, D and F respectively show the same items associated with a different training image. FIG. 7G shows a sketch model defined in accordance with the present invention.

FIG. 15 is a figure depicting the right eye region of the expected sketch images generated from three example input images using different neighborhood sizes in the probability distribution construction portion of the process of FIGS. 11–C.

FIGS. 16A–B are a flow chart diagramming a process for implementing the sketch model fitting action of the overall process of FIG. 9.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
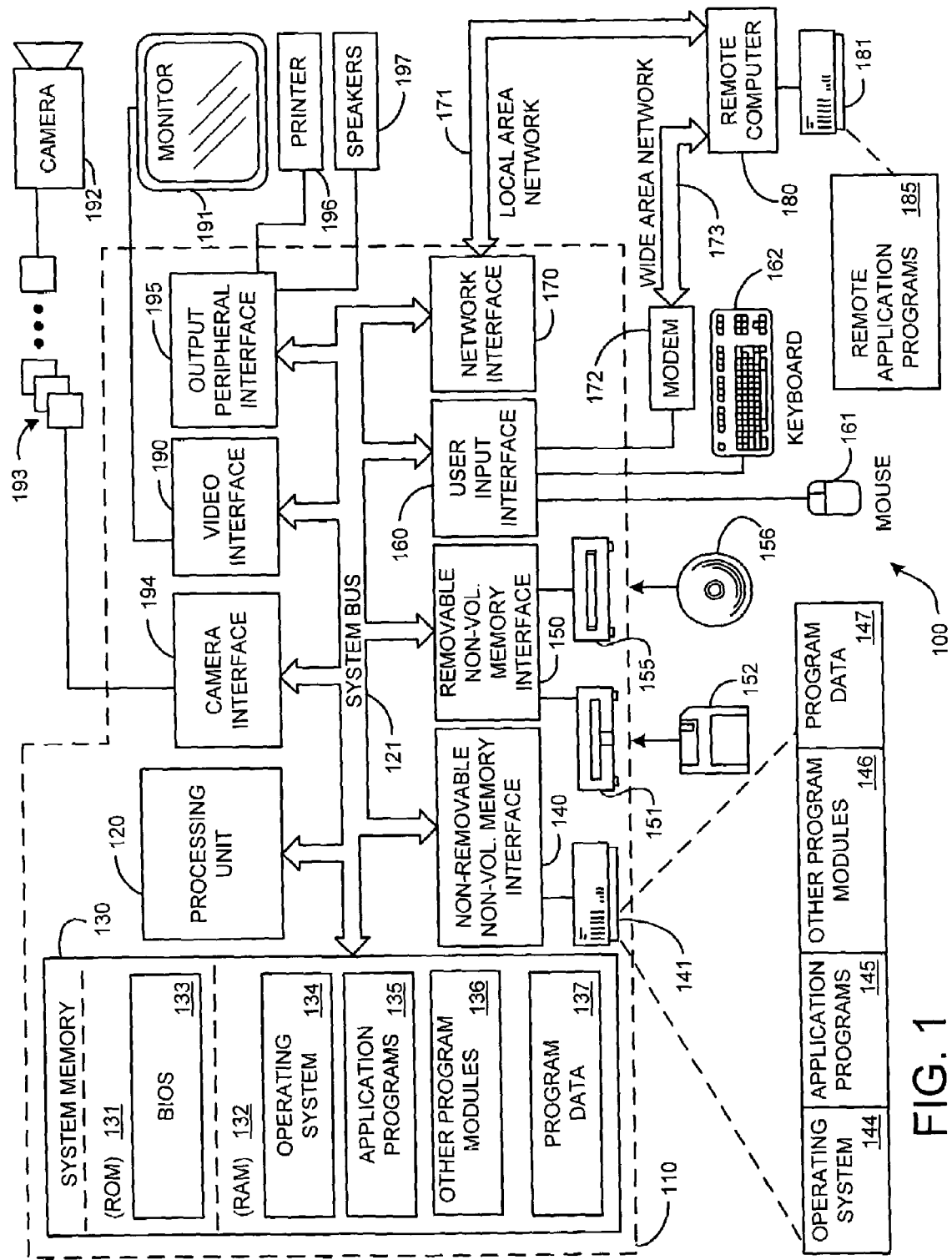
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention. Generally, the system and process according to the present invention involves automatically generating facial sketch images from images of a person's face. This generally involves two phases—namely a training phase and a runtime phase.

1. The Training Phase

The training phase generally employs example images and corresponding sketches of people's faces to teach the system to generate sketches reflecting the style of the example sketches. The reason example images and sketches are used derives from the fact that there is no precise rule of grammar in a sketching language. Even sketch artists themselves can rarely explain how they produce a sketch of a person's face. This makes a rule-based sketching system difficult to design and implement. Therefore, in order to automatically generate a stylistic facial sketch of a given image, an example-based approach is employed.

1.1 Training Data

Figure 2:
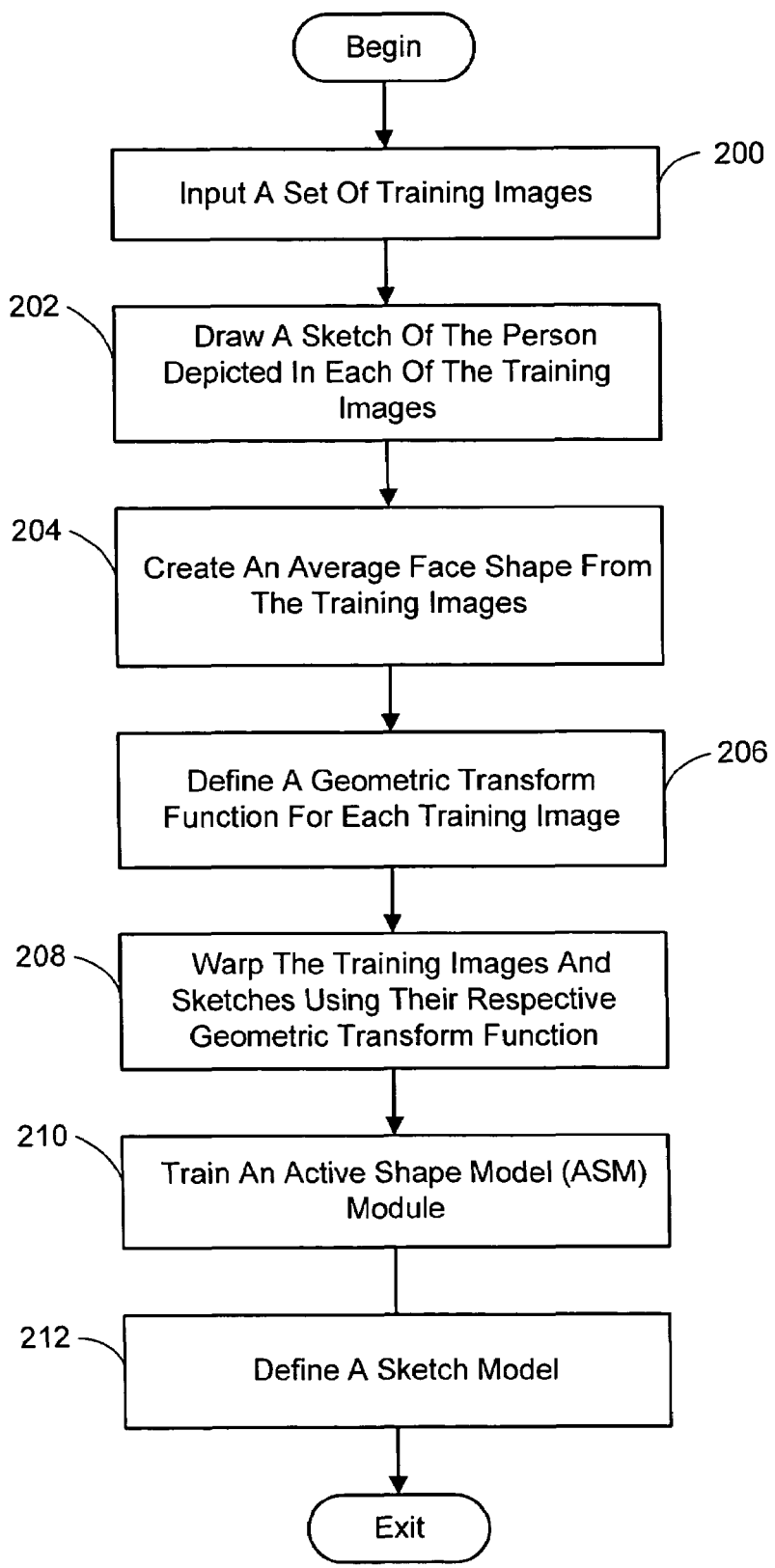
FIG. 2 is a flow chart diagramming an overall process for training a system to generate a sketch of a person's face from an image of that person's face, according to the present invention.

Referring to FIG. 2, the training phase begins with the inputting a set of training images (process action 200). Each training image is a frontal view of a person's face with no distracting elements such as a hat or glasses. The image may be either a gray scale image or a color image. Either way, each image is scaled and cropped so that the person's face in each image is approximately the same size and centered about approximately the same point in the image.

A sketch of the person depicted in each of the training images is produced manually by a "sketch artist" (process action 202). These sketches become training sketches, which along with the training images are used to train the automatic sketch generation system. As will be seen later, matched image and sketch pairs make the learning process much simpler. Tested embodiments of the present automatic sketch generation system and process employed 162 facial images and their corresponding sketches drawn by a sketch artist.

A sketch artist is defined for the purposes of the present invention as someone who is able to distill the identifying characteristics of a person's face and represent them in sketch form merely using a set of lines. In other words, a sketch artist is able to, with a few strokes; create a sketch of a person's face that others would recognize as representing that person. The way in which the sketch artist accomplishes this task, i.e., the number of lines employed, what features are represented and generally how these features are represented, exemplifies the style of the sketch artist. Typically, a sketch artist will repeat these stylistic traits from one sketch to the next. Thus, while, each sketch will be unique, the elements that are used to capture the essence of the appearance of a person's face will be for the most part consistent between sketches. It is these consistencies that it is desired to capture in the training phase so that novel sketches of a person's face can be generated automatically in the style of the sketch artist who produced the sketches of the training images.

It is noted that the sketches produced by the sketch artists from the training images are not exaggerations or caricatures of the depicted person's face. Rather, the lines making up these sketches are made to correspond to the locations of the features they represent in training images. Thus, if a training sketch were to be placed over and aligned with its associated training image, the lines of the sketch would overlay the outline of the features they represent in the training image. While the training sketches can be produced in any desired way by the sketch artist, one method employed in tested embodiments of the present invention to achieve the aforementioned alignment of the sketch lines to the represented features was to display a training image on a computer monitor screen using an image processing program having a layering feature which allows a user to "draw" lines on top of the displayed image and then save the drawn layer as a separate sketch image. The sketch artist simply draws the sketch of the depicted person's face over the displayed image making sure the sketch lines followed the contour of the features it was desired to represent and save the results as the training sketch associated with the displayed training image. This process is illustrated pictorially in FIGS. 3A–C. FIG. 3A is an original training image. FIG. 3B shows a sketch drawn on top of the original image by a sketch artist. And finally, FIG. 3C shows the extracted sketch.

Figure 4:
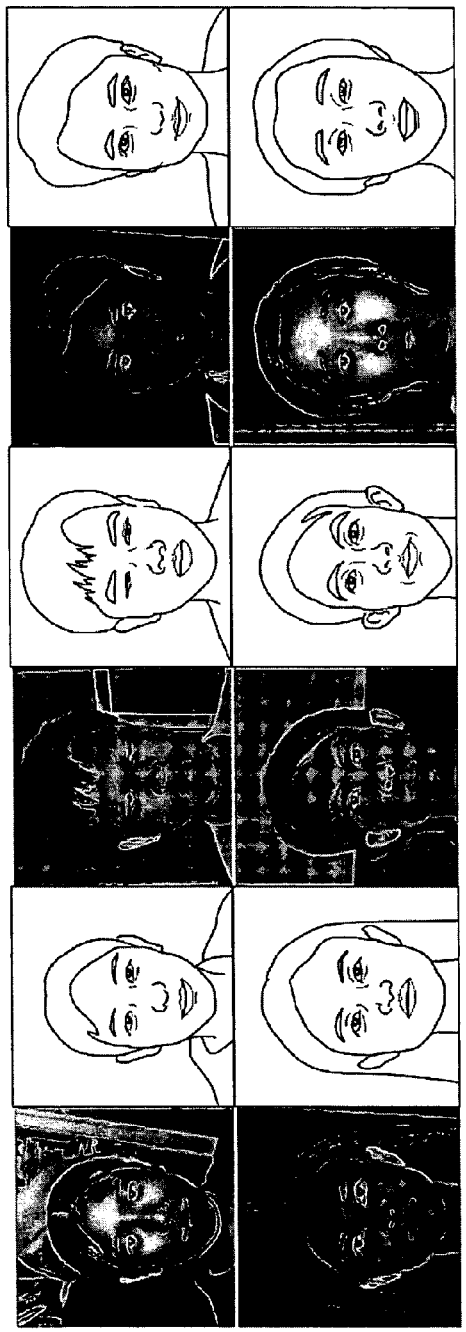
FIG. 4 is an image depicting a series of training data pairs.

More examples of training images and their corresponding training sketches drawn by a sketch artist can be found in FIG. 4.

1.2 Average Face Shape

The training images and sketches reflect a variety of different geometrical face shapes. This must be taken into account in training the system. To this end, an average shape is created from the training images in the form of a "MeanShape" vector (process action 204). Generally, creating the average face shape involves labeling a set of feature points corresponding to facial feature depicted in each of the training images $I_i$ in the training set. The locations of the labeled feature points from a training image are used to form a vector $Shapes_i$. The average of all the vectors is then computed to produce the vector MeanShape that represents the average face shape.

Figure 5:
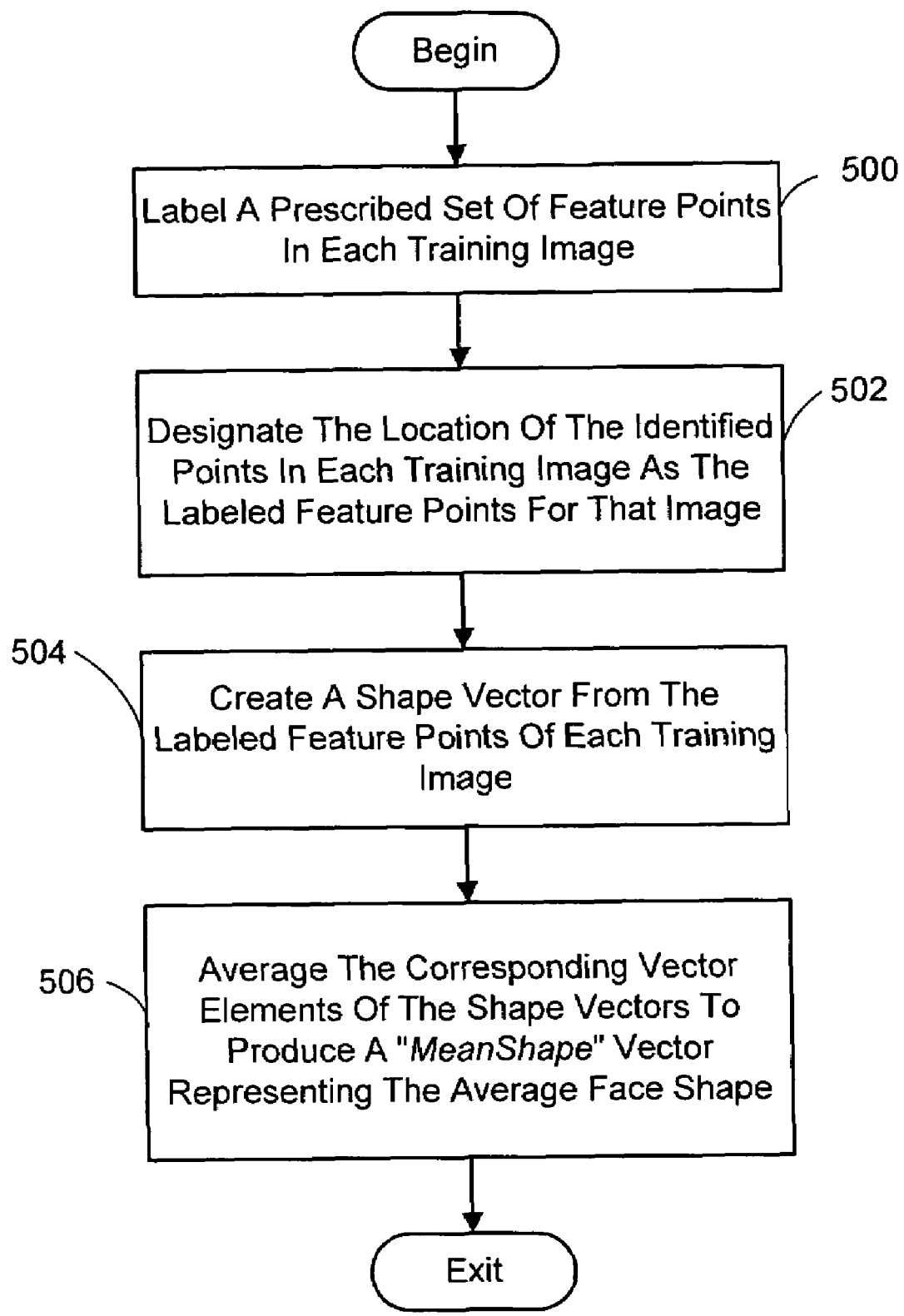
FIG. 5 is a flow chart diagramming a process for producing a MeanShape vector that represents the average face shape associated with the overall process of FIG. 2.

More particularly, referring to FIG. 5, the average face shape is created by first labeling a prescribed set of feature points in each training image (process action 500). This involves manually identifying feature points in a training image and then saving the locations of these points. In tested embodiments of the present invention this was done according to a set of rules by which the endpoints of prescribed face features are identified and then a prescribed number of equidistant points between the endpoints along the contour of the particular feature are also identified. The locations of the identified points in the training image are saved and designated the labeled feature points associated with that image (process action 502). For example, as shown in FIG. 6, in tested embodiments of the present invention 83 feature points were manually label on each face image. More particularly, the prescribed face features and their associated prescribed number of feature points included: the top and bottom edges of the eyebrows (5 points each), lips (20 points), the outline of the nose starting and ending at the top of the bridge of the nose (12 points), each eye lid (8 points each), and the outside edge of the face starting from about eyebrow height on one side and continuing to about eyebrow height on the other side of the face (15 points).

The labeled feature points derived from the training images are used to define an average face shape associated with the set of training images. Referring again to FIG. 5, this is accomplished by creating a shape vector from the labeled feature points of each training image, respectively (process action 504). This shape vector contains each labeled point location listed in a prescribed order such that the $n^{th}$ element of each vector corresponds to the same feature point. For example, the $n^{th}$ element of each vector might correspond to the $5^{th}$ feature point along the contour of the nose starting from the left side. This is of course just an illustrative example. Any order can be employed as long as the same order is used for each shape vector.

The shape vectors are then averaged by averaging each corresponding vector element among the vectors to produce a single vector, which is the aforementioned "MeanShape" vector (process action 506). The MeanShape vector thus represents the average location of each corresponding feature point.

1.3 Geometrically Transformed Training Images and Sketches

Referring again to FIG. 2, the training process continues with the MeanShape vector being used to define a set of geometric transform functions G—one for each training image (process action 206). Each transform function is essentially a flow field, which when combined with the shape vector associated with the function's training image produces the MeanShape vector. Thus, MeanShape=G (Shape).

Once the geometric transform function has been computed for each training image, the respective functions are used to warp their associated training image I, and the sketch S corresponding to that training image, into what will be referred to as a transformed training image I' and transformed sketch S' (process action 208). Thus, I'=G(I) and S'=G(S). This warping essentially uses the flow field to reassign the pixel location of each pixel in the training images and sketches. For pixels not coinciding with one of the feature points, conventional interpolative methods are employed to establish their new location in the transformed image or sketch.

The transformed training images and sketches discount the geometrical variations of different face shapes, and as will be seen later facilitate the automatic generation of sketches from input images.

1.4 Active Shape Model (ASM) Module

The aforementioned shape vectors are also used to train a conventional Active Shape Model (ASM) module, such as the one described in reference [7] (process action 210). Essentially, the ASM module will be used to automatically identify feature points in input images from which a sketch is to be produced. Thus, in the runtime phase of the present sketch generator system and process, the feature points will not have to be manually labeled as with the training images.

1.5 The Sketch Model

Referring once again to FIG. 2, the training phase is completed by defining a sketch model (process action 212). As described previously, a sketch is made up of a plurality of line segments. The sketch model is constructed to model the style of the sketch artist by including the particular line segments typically found in sketches produced by the artist as exemplified in the transformed training sketches S'. Generally, this is accomplished by using the training sketches to decide what lines are to be included in the sketch model. The position of each included line is established using control points that define both the shape and location of the line. In tested embodiments of the present invention, the foregoing process of defining the sketch model P(S') involved representing the model as a set S containing a fixed number of lines, each of which is defined by an "on-off switch", its width and a plurality of control point locations. Specifically, $S=\{L_i: i=1, 2; \ldots, k\}$, where k is the number of lines. For the $i^{th}$ line $L_i=\{c_i, \omega_i, \theta_i\}$, where $c_i$ is an on-off switch with $c_i=0$ signifying not to draw this line and $c_i=1$ meaning to draw it. In addition, $\omega_i$ is the width of this line. And finally, $\theta_i=\{(x_j; y_j); j=1, 2, \ldots, n_i\}$ are the control points of this line, where $n_i$ is the number of control points. It is noted that the control points are different from the feature points employed in the ASM model. The decision as to what lines are to be included in set S is done manually and should include at least those lines found in most of the training sketches.

Figure 7A:
FIGS. 7A–G are images exemplifying the flexible sketch model according to the present invention.
Figure 7B:
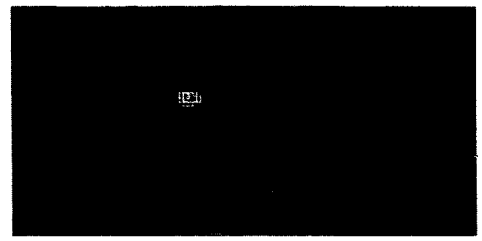
Figure 7C:
Figure 7D:
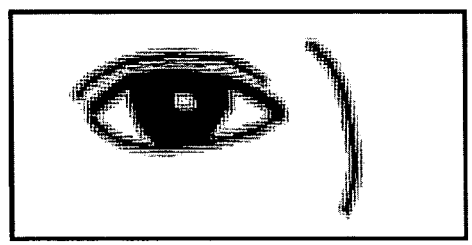
Figure 7E:
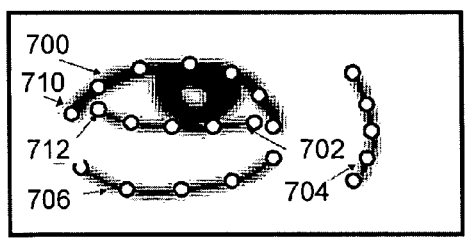
Figure 7F:
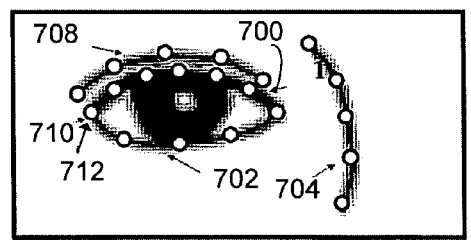
Figure 7G:
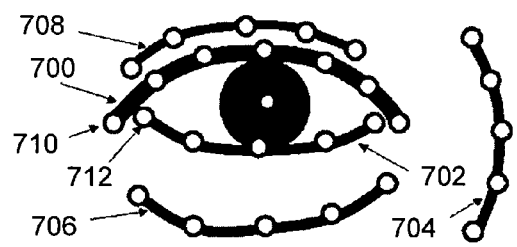

It is important to have a flexible sketch model so that the sketch artist's style can be captured. For example, consider the right eye segments from two different training images, as shown in FIGS. 7A–B. FIGS. 7C–D respectively depict the sketches of these eye segments created by the same sketch artist, and FIGS. 7E–F respectively illustrate these sketches with the individual lines and their associated control points highlighted. Note that each sketch is defined as a combination of four lines and an eyeball. Lines 700, 702 and 704 appear in both FIGS. 7E–F. However, there is a line 706 below the eye in FIG. 7E, that does not appear in FIG. 7F. Similarly, there is a line 708 above the eye in FIG. 7F, but not in FIG. 7E. If it were supposed that the sketch of the eye segment shown in FIGS. 7C–D were indicative of all the training sketches produced by the sketch artist, then it would appear that lines 700, 702 and 704 always appear, while lines 706 and 708, only sometimes appear. A flexible sketch model would include a provision to handle the situation where a particular line may or may not appear in the training sketches. The aforementioned on-off switch is employed to model this kind of effect. Essentially, as shown in FIG. 7G, all five lines 700, 702, 704, 706 and 708 are included in the sketch model of the right eye segment. However, when using the model as will be described shortly, those lines such as 706 and 708 that may or may not appear in a sketch of an image, would have their on-off switch set to "on" if they are to appear, or to "off" if they are not to appear.

Additionally, it is noted that there is no restriction on the locations of lines or their endpoints in the sketch model. For example, control point 710 and control point 712 are separated in FIG. 7E, but they coincide in FIG. 7F.

Each line in the sketch model is additionally characterized as being one of three line types, depending on whether the line is affected by others or not. The first line type is one that always appears in every training sketch. The second line type is one which does not appear in every training sketch, but when it does, its appearance is independent of any other line that may or may not appear in the sketch. The final line type is one which appears in the training images only when one or more other lines are present or absent. The line type will ultimately dictate whether a particular line included in the sketch model appears in a sketch generated by the present system and method, as will be discussed later. Essentially, if a modeled line is to appear in a generated sketch the on-off switch element will be set to "on", and if the line is not to appear the switch element will be set to "off".

As to the position of an included line in the sketch model, this is determined by modeling the line segment using control points as mentioned previously. The locations of the control points defining each line in the sketch model are determined from the position of the line in the transformed training sketches.

1.6 Training Phase Summary

Figure 8:
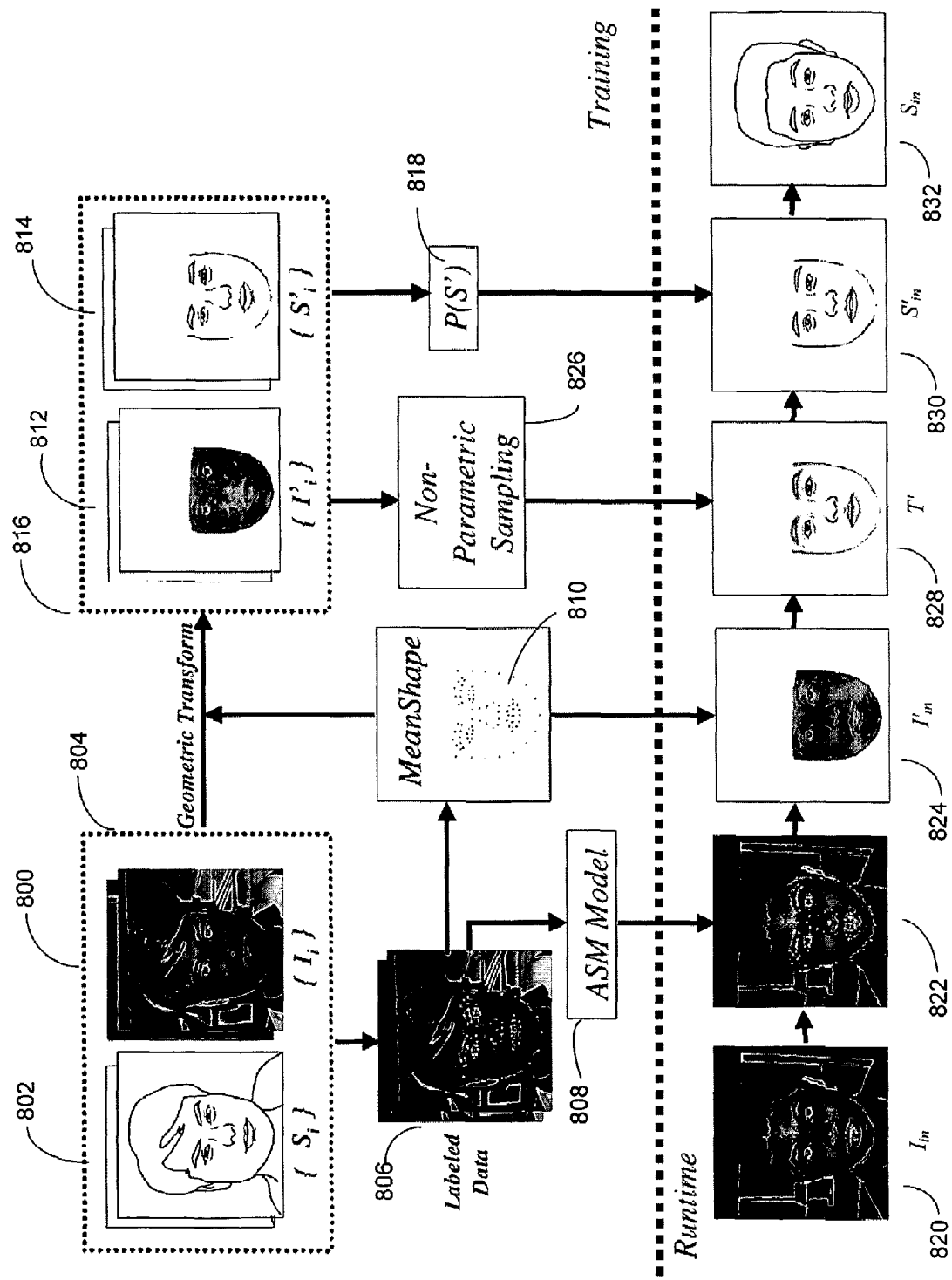
FIG. 8 is an image pictorially summarizing the training and runtime phases of the present invention.

Referring to FIG. 8, the foregoing training phase can be summarized pictorially as follows. First, a set of frontal view, facial training images $\{I_i\}$ 800 is input. A set of corresponding sketches $\{S_i\}$ 802 of the face depicted in each training image is then drawn. Thus, the training data consists of a plurality of image and sketch pairs as depicted inside the broken line box 804. A set of facial feature points is then labeled in each of the training image, as exemplified by the labeled images 806. The labeled feature points are used to train an ASM module 808 to automatically locate facial feature points in any input image. In addition, the labeled feature points are used to define the average shape of all input sketches as represented by the MeanShape vector (which is represented as the feature point image 810 in FIG. 8). A geometric transform function G is then defined for each training image and sketch pair using the MeanShape vector as follows: MeanShape=G(Shape), where Shape is a shape vector formed from the labeled facial feature points associated with the training image for which the transform function is being computed. Each geometric transform function is used to warp the associated training image and sketch pair to a transformed image and sketch pair which depict the faces in an average shape form, i.e., I'=G(I) and S'=G(S). Thus, a set of transformed training images $\{I_i'\}$ 812 and a set of transformed sketches $\{S_i'\}$ 814 are formed, as depicted inside the broken line box 816. Finally, a sketch model P(S') 818 is defined using the set of transformed sketches $\{S_i'\}$ 814 as a guide.

2. The Runtime Phase

Figure 9:
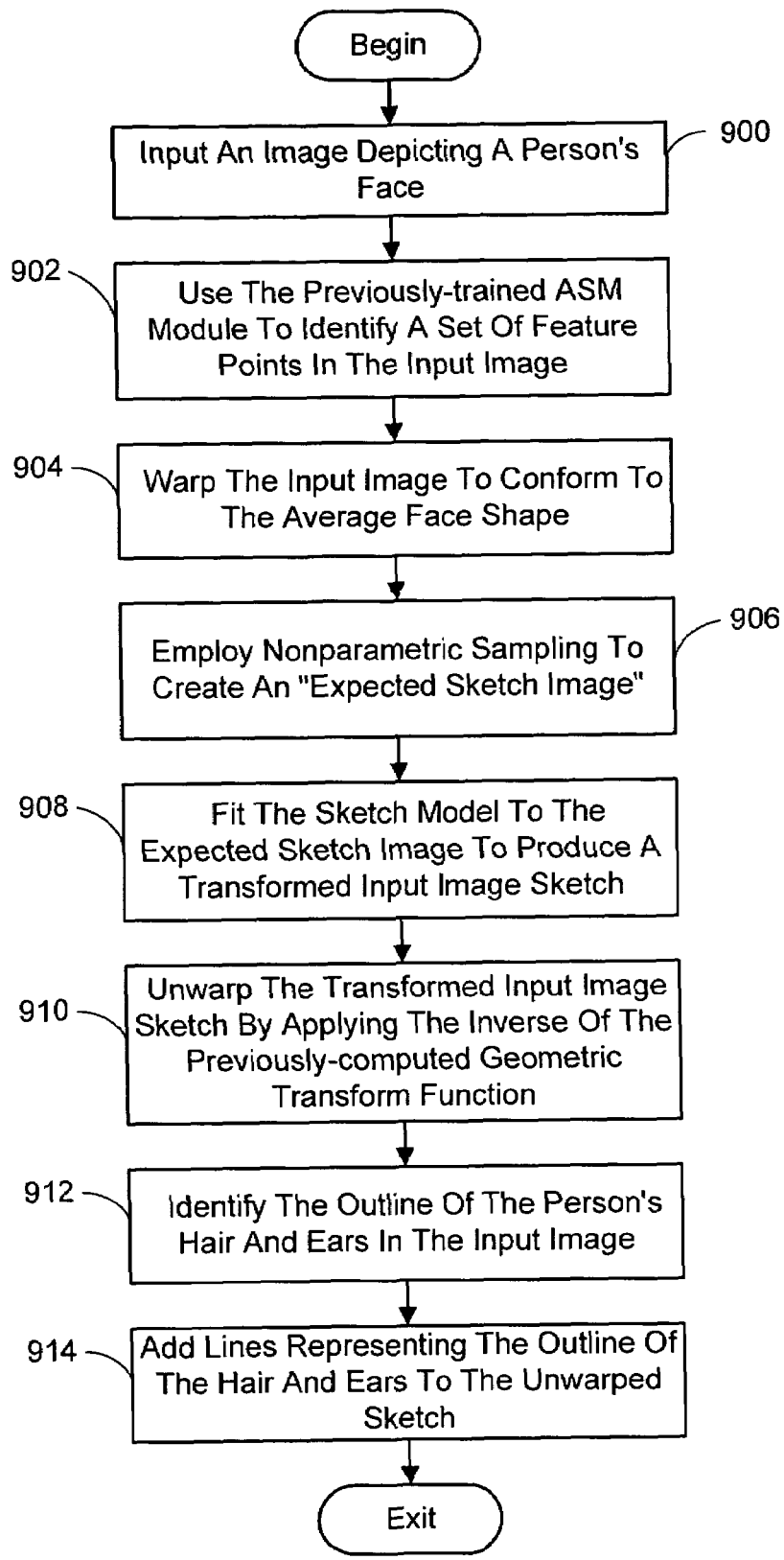
FIG. 9 is a flow chart diagramming an overall process for generating a sketch of a person's face from an image of that person's face, according to the present invention.
Figure 10:
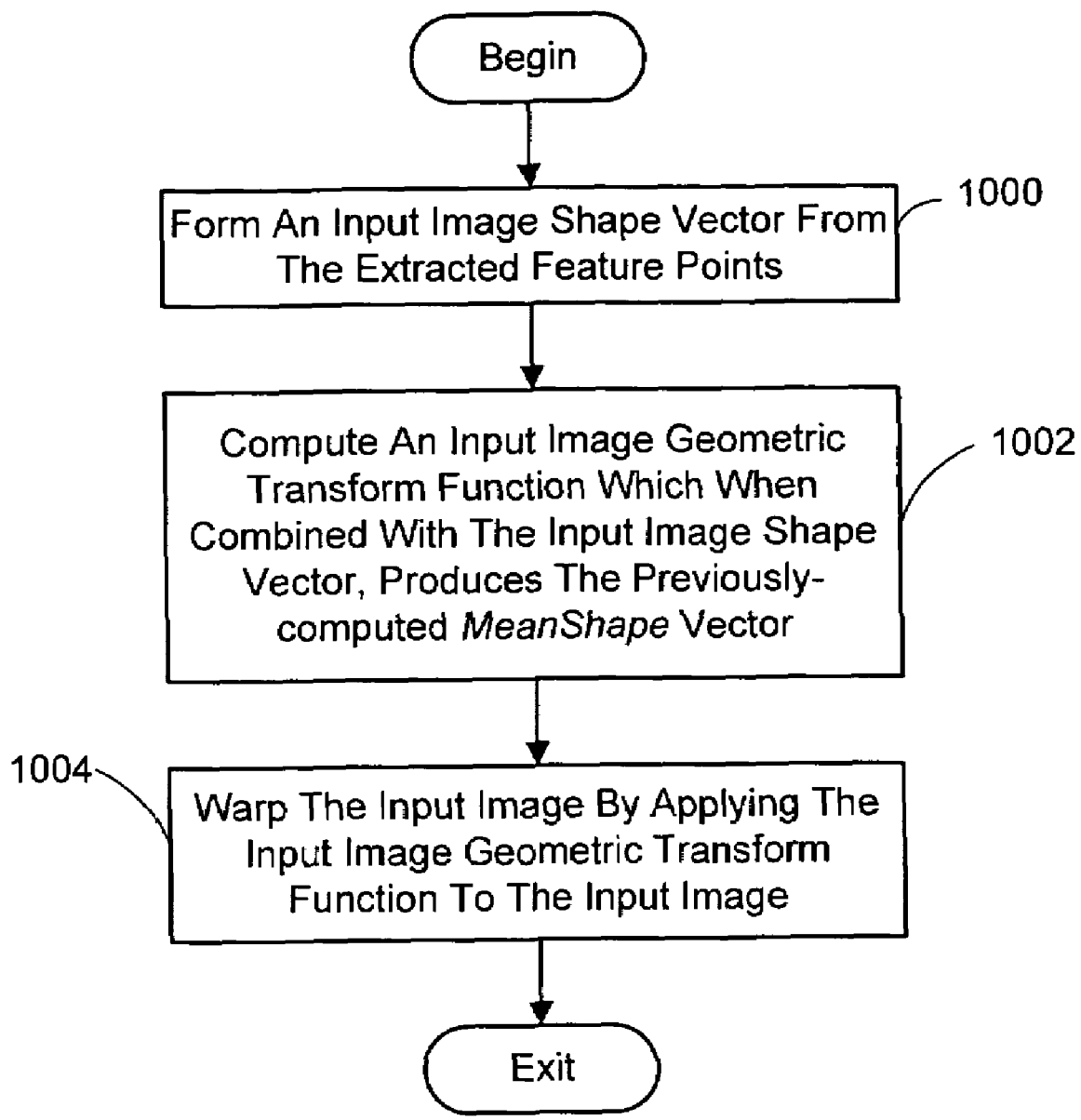
FIG. 10 is a flow chart diagramming a process for implementing the input image warping action of the overall process of FIG. 9.

Referring to FIG. 9, the runtime phase of the present sketch generation system and process begins with the input of an image depicting a person's face from an approximately frontal view (process action 900). The input image is scaled and cropped via conventional methods to match that of the training images. The previously-trained ASM module is applied to extract a set of feature points from the input image (process action 902). In addition, a transformed input image is created in the same way the transformed training images were created, i.e., by warping the input image to conform to the average face shape (process action 904). More particularly, referring now to FIG. 10, an input image shape vector is formed from the extracted feature points (process action 1000). The order of the elements of this shape vector mirrors that of the shape vectors formed from the training images. Next, a geometric transform function is established by computing the flow field, which when combined with the input image shape vector, produces the previously-computed MeanShape vector (process action 1002). This geometric transform function $G_{in}$ is then applied to the input image $I_{in}$ to create a transformed input image $I_{in}'$, i.e., $I_{in}'=G_{in}(I_{in})$, thus warping the input image to conform to the average face shape (process action 1004). As with the transformed training images, the transformed input image $I_{in}'$ is created by using the transform function to reassign the pixel location of each pixel in the input image $I_{in}$.

2.1 Expected Sketch Image

The subtle styles of facial sketches are embedded in the complex statistical relationship between I' and S'. Referring again to FIG. 9, in order to extract these stylistic characteristics and apply them to the sketch generated from an input image, a nonparametric sampling method is employed to create an "expected sketch image" (T') (process action 906). First, it is noted that the probability distribution of a sketch point, for a given pixel in the input image and its neighbors, is assumed to be independent of the rest of the image. Given this, the expected sketch image is generally produced as follows. For each pixel in the input image, sample images are queried and corresponding pixels are found. Only those pixels with a small enough difference (i.e., the k-nearest-neighbors) are used to determine how likely it would be drawn as a point in the sketch, or the distribution of a sketch. Cross-correlation is used to compare pixels with square neighborhoods. A local search is employed to find the best match between images to deal with slight geometrical misalignments that may exist even after warping the images to the MeanShape.

Figure 11A:
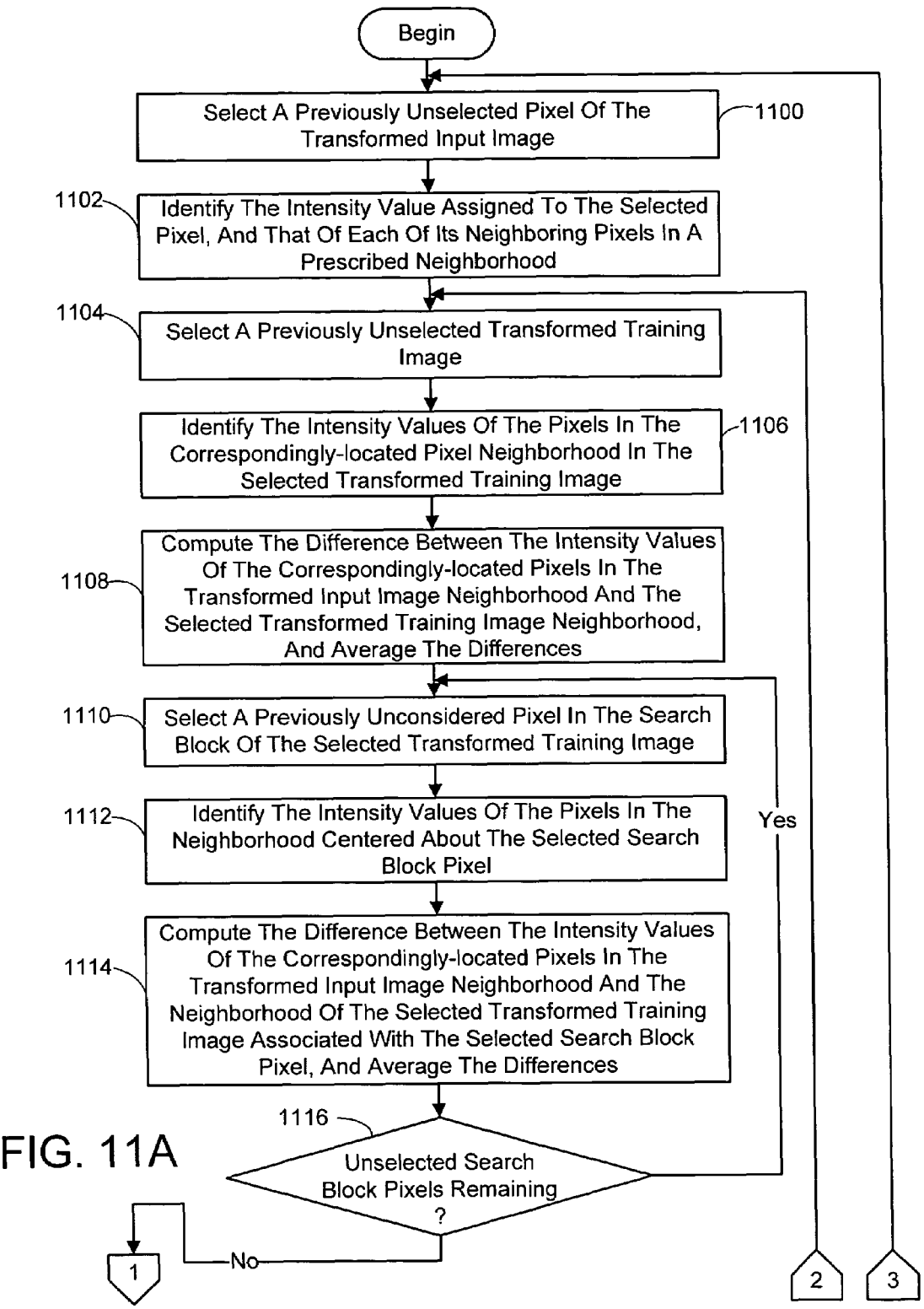
FIGS. 11A–C are a flow chart diagramming a process for implementing the expected sketch image creation action of the overall process of FIG. 9.
Figure 11B:
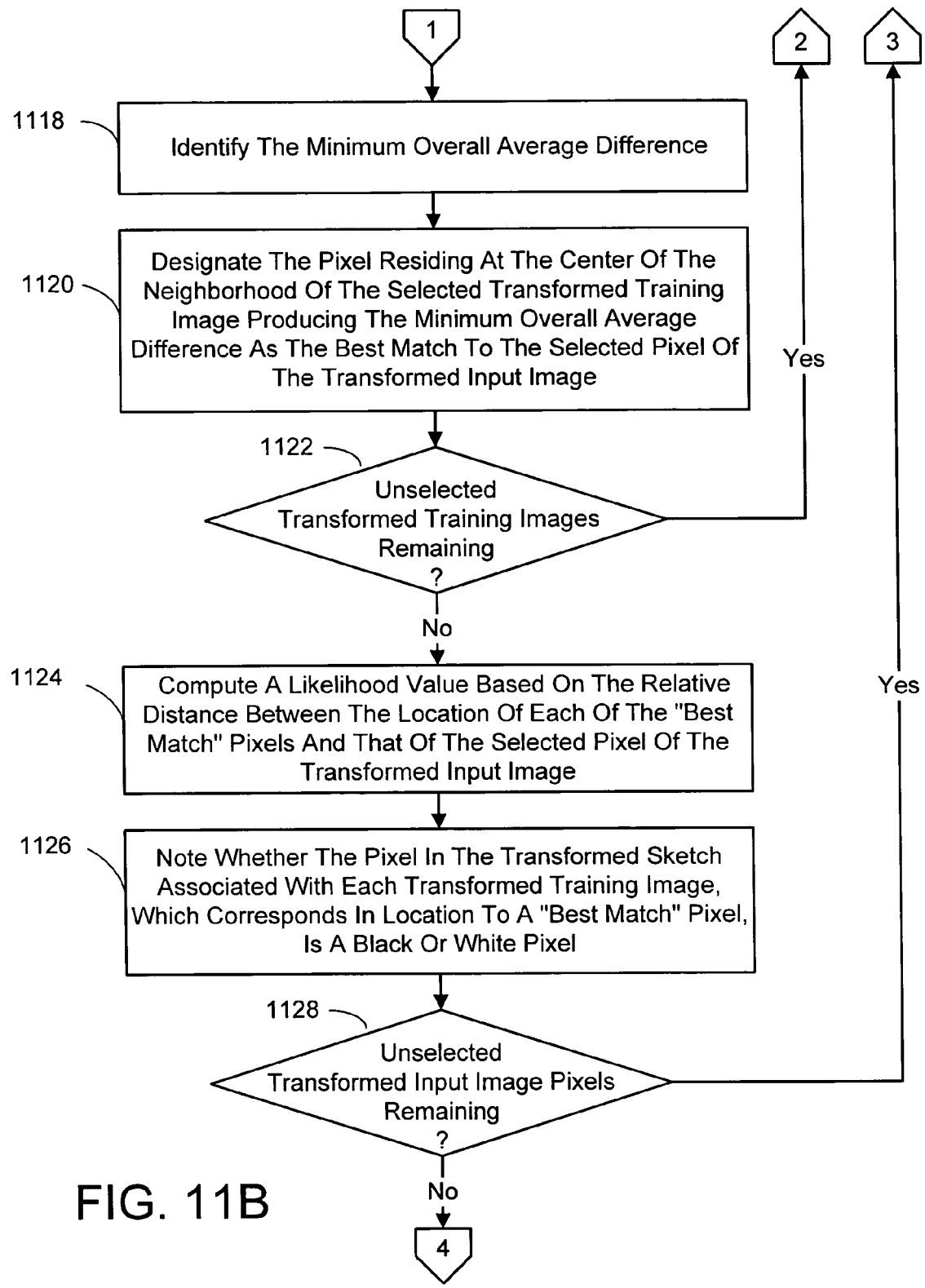
Figure 11C:
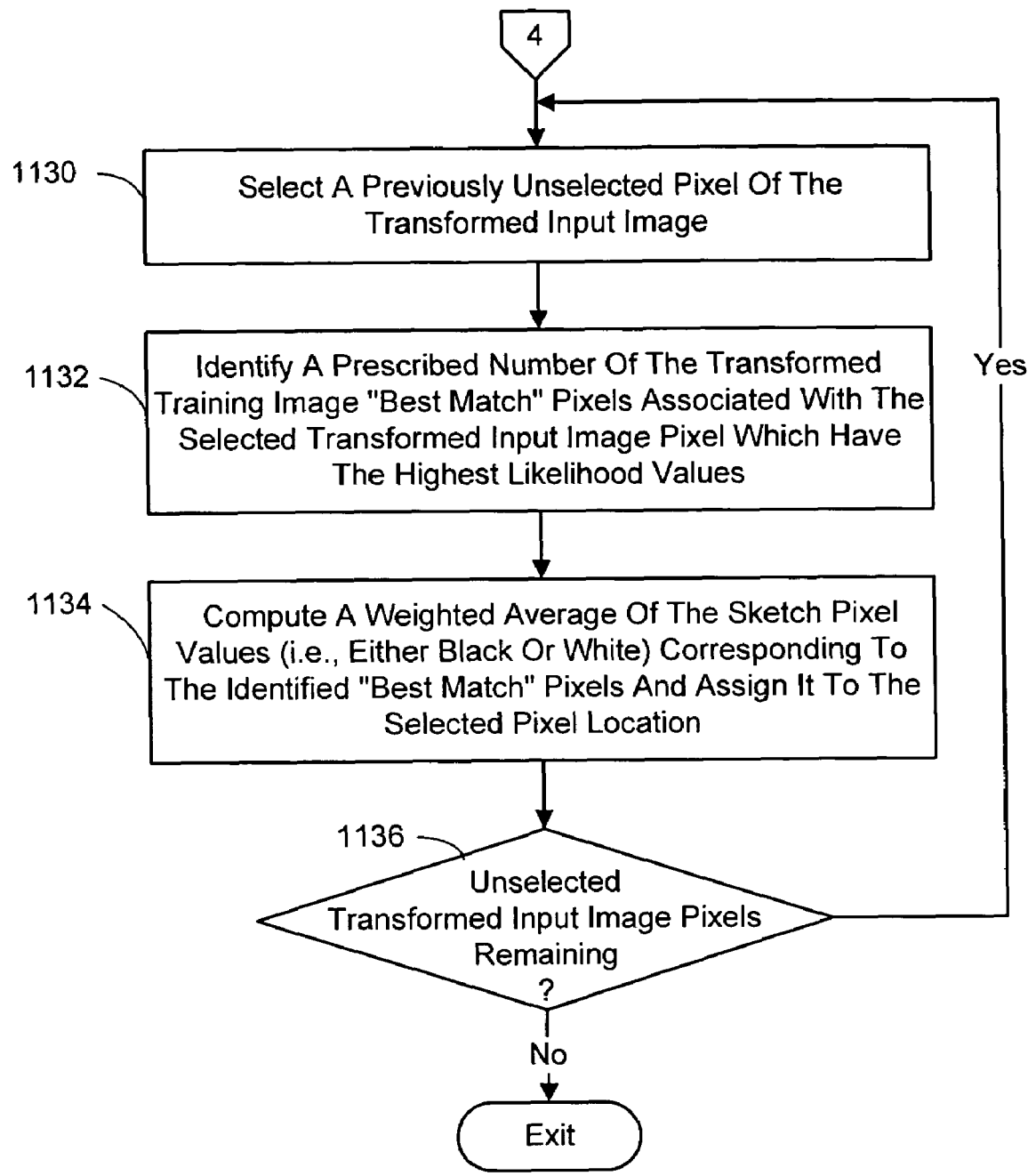

More particularly, the expected sketch image is generated by first comparing each pixel of the transformed input image to correspondingly located pixels of the transformed training images to find the best match for each training image. Referring to FIGS. 11A–C, this is accomplished by selecting a previously unselected pixel of the transformed input image (process action 1100). The intensity value assigned to the selected pixel, and that of each of its neighboring pixels in a prescribed square neighborhood centered about the selected pixel, are identified (process action 1102). It is noted that the intensity value can be any measure of the pixel's intensity appropriate for the input and training images. For example, if the images are gray-scale images, the gray scale value can be used as the measure of a pixel's intensity. Or, for example if the images are color images, the overall pixel intensity component (i.e., R+G+B) could be used as the measure of a pixel's intensity. Further, while pixel intensity values were employed as the basis of comparison in tested embodiments of the present invention, other pixel characteristics could be employed instead.

Next, a previously unselected one of the transformed training images is selected (process action 1104), and the intensity values of the pixels in the correspondingly-located pixel neighborhood are identified (process action 1106). The difference between the intensity values of the correspondingly-located pixels in the neighborhood associated with the selected pixel of the transformed input image and that of the selected transformed training image are computed, and the individual differences are averaged to produce an overall average difference for the neighborhood (process action 1108).

This procedure is then repeated for a same sized neighborhood of pixels in the transformed training image surrounding each remaining pixel in a prescribed search block centered on the original corresponding selected pixel location. The purpose of this search is to account for any noise induced misalignment between the transformed input image and the transformed training images. Specifically, a previously unconsidered pixel of the selected transformed training image that resides within the search block is selected (process action 1110), and the intensity values of the pixels in the prescribed-sized neighborhood centered about the selected transformed training image pixel are identified (process action 1112). The difference between the intensity values of the correspondingly-located pixels within the neighborhood associated with the selected pixel of the transformed input image and that of the neighborhood centered about the currently selected transformed training image pixel are computed, and the individual differences are averaged to produce an overall average difference (process action 1114). It is then determined if there are any remaining pixels of the selected transformed training image within the search block that have not been selected (process action 1116). If so, process actions 1110 through 1116 are repeated until no remaining unconsidered pixels remain.

Once all the pixels within the search block have been considered, the minimum overall average difference calculated in the comparison process is identified (process action 1118), and the pixel residing at the center of the neighborhood of the selected transformed training image producing this minimum overall average difference is designated as the best match to the selected pixel of the transformed input image being considered (process action 1120). The foregoing process is then repeated for each of the remaining transformed training images. This is accomplished by determining if any previously-unselected transformed training images remain (process action 1122) and if so repeating process action 1104 through 1122. Thus, when all the transformed training images have been considered, a pixel in each will have been designated as the best match for the selected pixel in the transformed input image.

It is next determined how likely it is that the pixel in each transformed training image designated as being the best match to the currently selected pixel of the transformed input image actually corresponds to the selected pixel. This is done by computing a distribution. Specifically, a likelihood value is computed based on the relative distance between the location of each of the "best match" pixels and that of the selected pixel of the transformed input image (process action 1124). In other words, for each pixel designated to be the best matching, a value indicative of the likelihood that it actually corresponds to the transformed input image pixel currently under consideration is computed. This likelihood value is based on the distance separating the location of the designated best matching pixel in a particular transformed training image under consideration and the location of the transformed input image pixel currently under consideration relative to the separation distances computed between the designated best matching pixels of the other transformed training images and the transformed input image pixel under consideration. In addition, it is noted whether the pixel in the transformed sketch associated with each transformed training image, which corresponds in location to a "best match" pixel, is a black or white pixel (process action 1126). Thus, there is a designation as to the likelihood that the identified "best match" pixel in each of the transformed training images corresponds to the selected pixel of the transformed input image, and a designation as to whether the pixel in the sketch associated with each transformed training image that corresponds to the location of a "best match" pixel has a black or white pixel value.

The foregoing procedure is then repeated for each remaining pixel of the transformed input image. Thus, it is determining if there are any remaining unselected transformed input image pixels (process action 1128), and if so process actions 1100 through 1128 are repeated, until no unprocessed pixels remain.

Figure 12:
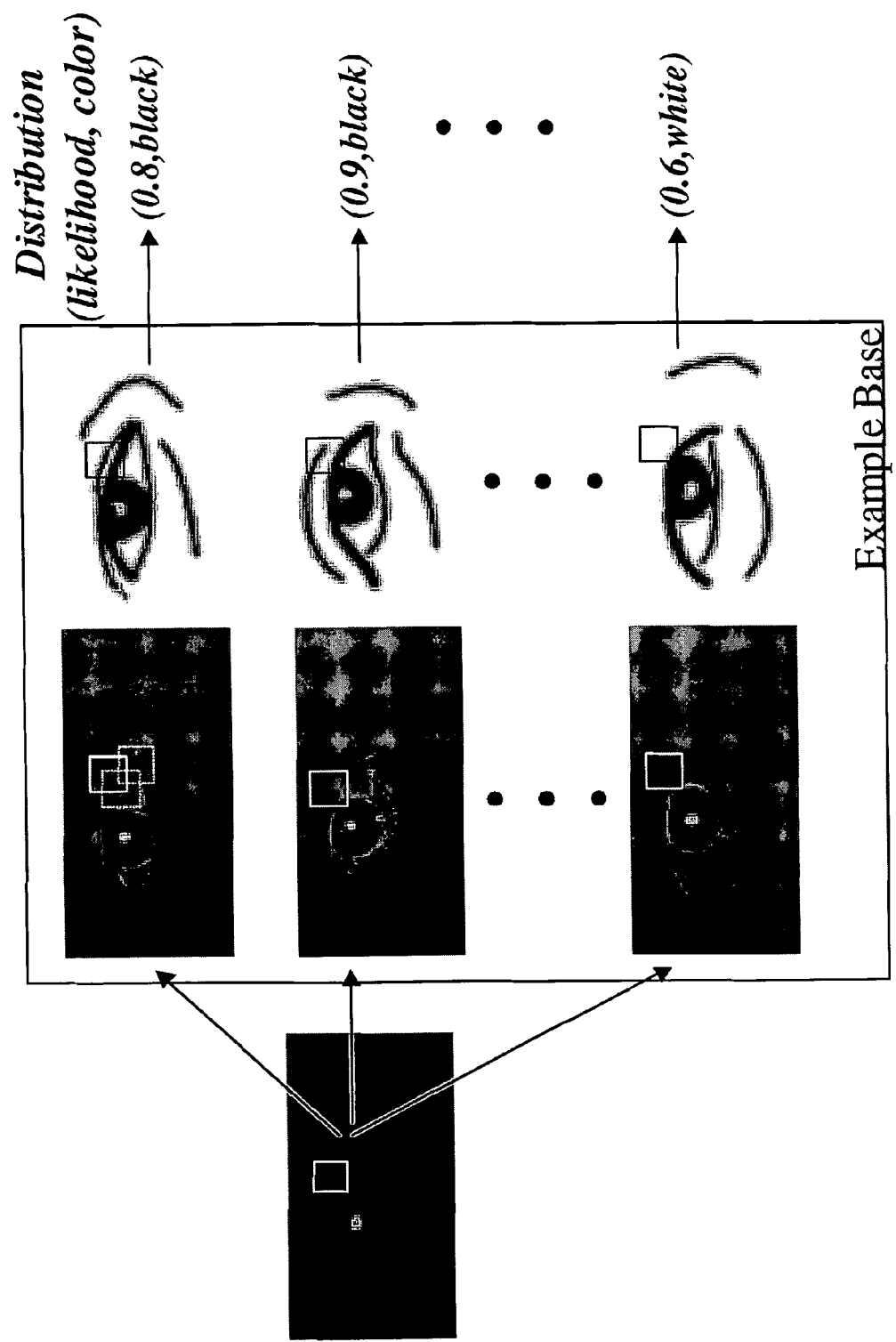
FIG. 12 is an image pictorially summarizing the construction of a probability distribution of training sketch pixels best matching a given pixel of an input image according to the process of FIGS. 11A–C.

The foregoing procedure, as it pertains to a particular pixel of the transformed input image is summarized pictorially in FIG. 12. As can be seen, a neighborhood of pixels associated with the right eye region in a transformed input image shown on the far left side of the figure, is compared with a similarly sized neighborhood within a search block surrounding the corresponding right eye region in the transformed training images (three of which are shown in the left-center part of the figure). It is noted that the search process is represented in the topmost of the transformed training images. To the right-center of the figure, the right eye region of the transformed training sketches corresponding to the depicted transformed training images are shown with the outline of the neighborhood containing the "best match" pixel location highlighted in each. To the far right of the figure, some distribution data is listed. As can be seen, for the topmost transformed training sketch depicted, the best match pixel has been assigned a likelihood that it corresponds to the pixel of the transformed input image of 0.8, and that the pixel in the transformed sketch is a black pixel. Similar distribution data is shown for the other depicted examples.

Once all the input image pixels have been processed, the aforementioned expected sketch image is generated. This entails integrating the computed distribution. Specifically, referring to FIG. 11C, a previously unselected pixel location in the transformed input image is selected (process action 1130). A prescribed number of the transformed training image "best match" pixels associated with the selected transformed input image pixel which have the highest likelihood values are identified (process action 1132). The number of transformed training image "best match" pixels in the selected sample should be enough to mitigate the effects of any noise in the images, while at the same time not be so many that detail is lost in the expected sketch image produced. As will be discussed in detail below, in tested embodiments of the present sketch generation system and process, it was found a number equaling approximately 25% of the total number of training images produced good results. A weighted average of the sketch pixel values (i.e., either black or white) corresponding to the identified "best match" pixels in the selected sample is computed and assigned to the selected pixel location (process action 1134). The contribution of each sketch pixel value to the weighted average is based on the designated likelihood that its corresponding "best match" pixel in the associated transformed training image corresponds to the pixel of the transformed input image under consideration. This process is repeated for each pixel location of the transformed input image, and a resulting weighted average pixel value is assigned to each pixel location, respectively, to generate the expected sketch image. Specifically, it is next determined if there are any remaining previously unselected pixels in the transformed input image (process action 1136). If so, then process actions 1130 through 1136, are repeated until no unprocessed pixel locations remain. At that point the process ends.

It is noted that in the above-described process, the distribution data for each pixel location was computed first before integrating it. This was done to facilitate the explanation of the process. It is also possible to compute the value of each pixel of the expected sketch image on a pixel by pixel basis. In this alternate method, once the distribution data corresponding to the currently selected pixel location of the transformed input image is computed, it can be used immediately to derive the pixel value for that location in the expected sketch image, before going on to the next pixel location, and so on. Either method is acceptable.

Figures 13, 14:
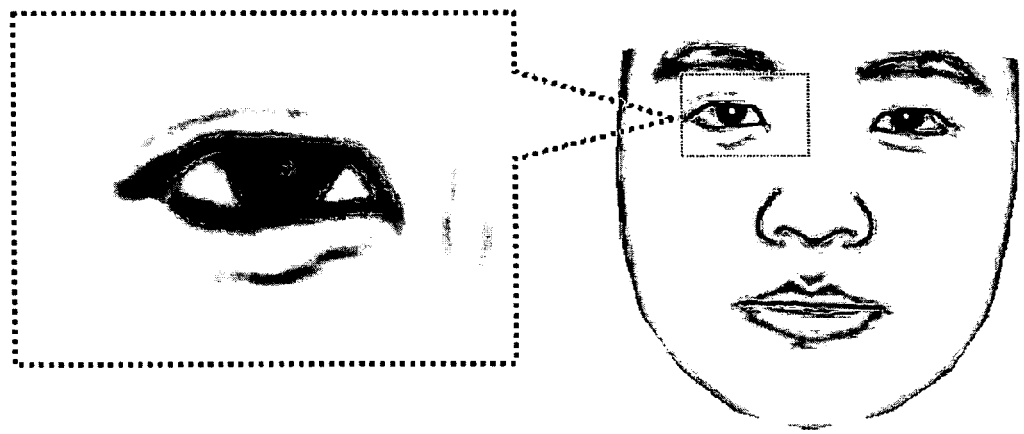
FIG. 13 is an image depicting an example of an expected sketch image with a blown-up portion showing the right eye region thereof.
FIG. 14 is a figure depicting the right eye region of the expected sketch images generated from three example input images using different numbers of the best matching pixels having the highest likelihood values assigned thereto in the integration portion of the process of FIGS. 11A–C.

An example of an expected sketch image (T') produced in the foregoing manner is shown in FIG. 13 and includes a blow-up of the right eye region. It is noted that the expected sketch image will actually be a gray scale image approximating a sketch.

In the foregoing description of the process for generating the expected sketch image using nonparametric sampling, a prescribed neighborhood and a prescribed search block are employed. In addition, a prescribed number of the transformed training images corresponding to those having the highest likelihood that the identified "best match" pixel in each of the transformed training images corresponds to the pixel of the transformed input image under transformed training images consideration are employed. Thus, the question arises as to how large the prescribed neighborhood and pixel block should be, and how many of the "highest likelihood" pixels from the transformed training images should be used. In connection with tested embodiments of the present invention a series of experiments was conducted to identify the prescribed sizes that would produce good results, while minimizing processing time as much as possible. FIG. 14 shows the effect of using different numbers of samples K (i.e., the number of "highest likelihood" transformed training image pixels). If all of the training images are used (which in the exemplified case K=80), a significant loss of detail results. For example, the lines above and to the right of the eye of Example 1 in FIG. 14 become almost invisible when K is 80. On the other hand, if too few samples are used, the results will be noisy. For example, when K was set to 1 in the example illustrated in FIG. 14, it can be seen that the resolution of the resulting sketch is poor. In practice, it was found that using the "best match" pixels from approximately 25% of the "highest likelihood" transformed training images (i.e., about 20) associated with each pixel of the input image produce good results for the particular sketching style of the training sketches used in the example illustrated in FIG. 14.

As indicated previously, the neighborhood size also affects the quality of the generated sketches. FIG. 15 shows a comparison of generated sketches using different neighborhood sizes, when the pixel block size representing the search window was fixed at 5×5 pixels, and the sample number K is set to 20. As can be seen when the neighborhood size is made large (e.g., N=15×15 pixels), the sketch details begin to disappear. On the other hand, if the neighborhood size is made small (e.g., 3×3 pixels), the sketches become noisy. In practice, it was found that 7×7 pixels is a good size for the neighborhood for the particular sketching style of the training sketches used in the example illustrated in FIG. 15.

The effect of the search window pixel block size was also investigated. However, it was discovered that search window size did not affect the sketch results significantly. In tested embodiments of the present invention, the search window block size was set to 5×5 with good results.

It is noted that the foregoing experimentation identified appropriate sizes for the style of the sketches employed. Other sketching styles as embodied in the training sketches may require these sizes to be modified to produce the sketch quality desired. However, the appropriate sizes can be easily determined for a particular application using the analysis technique described above. In addition, requirements as to quality of the resulting sketches may be lower than desired in the above-described experimentation. Thus, fewer samples or a smaller neighborhood size might be employed with satisfactory results in such applications. Accordingly, while particular sizes were employed in the tested embodiments, it is not intended that the invention be limited to these values. Rather, the appropriate sizes should be selected for a particular application of the present invention based on the techniques described above which result in the quality of sketch desired.

2.2 The Transformed Sketch of the Input Image

Referring again to FIG. 9, the sketch model P(S') is next fit to the expected sketch image T' to obtain a geometrically transformed sketch of the input image $S_{in}'$ (process action 908). This can be a difficult task. Fortunately, in connection with the present sketch generation system and process this difficulty is lessened considerably because, after the coarse feature localization by ASM, the possible solution of each line segment is constrained to a very small region. In addition, the dimension of parametric space of each line is often low.

Figure 16A:
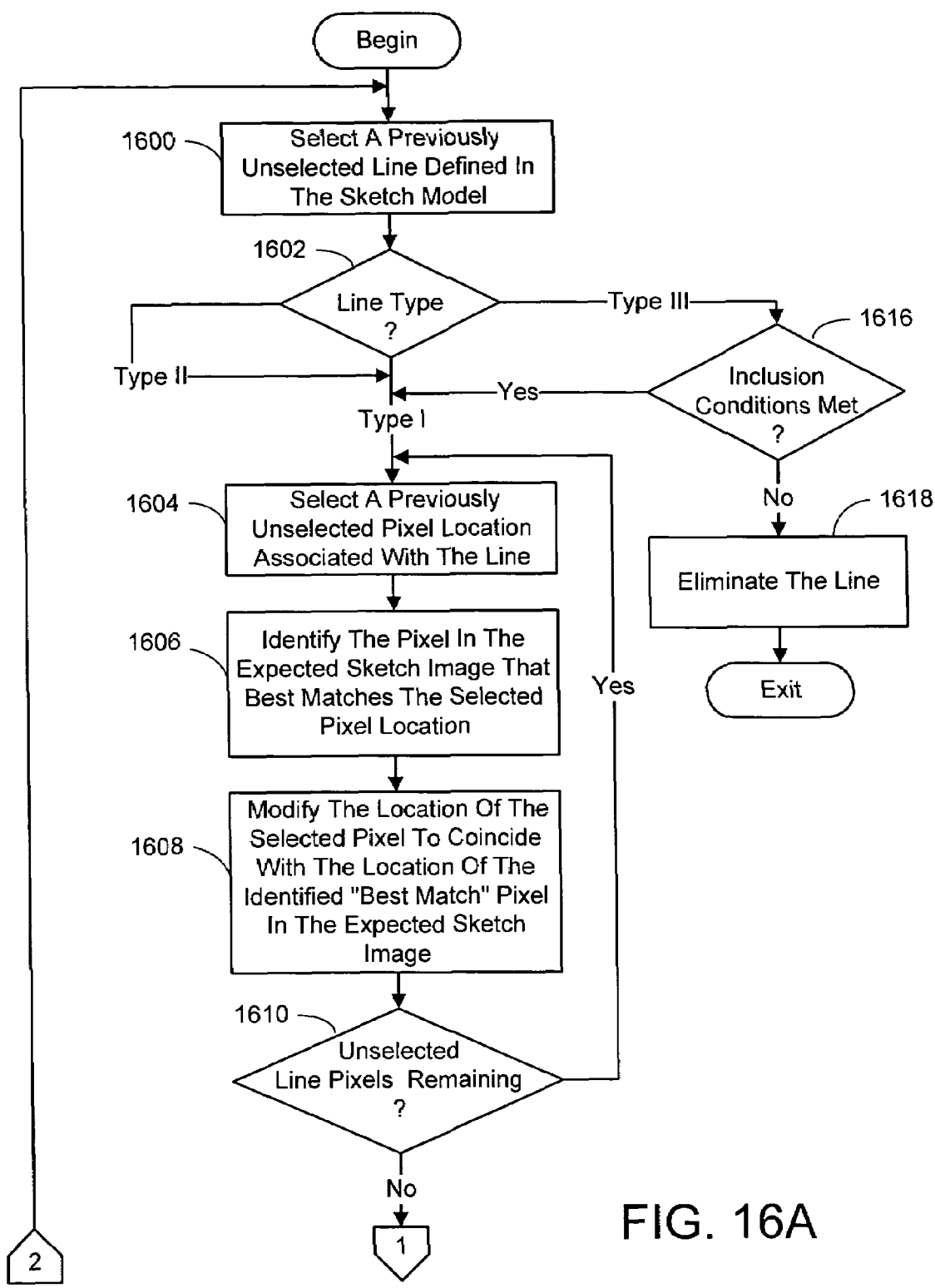

Essentially, a best fit procedure is used to fit the previously-defined sketch model to the expected sketch image. One way of accomplishing this task is to attempt to match lines defined by the sketch model to a corresponding feature in the expected sketch image and then to modify the control point locations of the line so as to fit it to the contour of any identified feature. In doing this, the line type is taken into account. Specifically, referring to FIGS. 16A–B, a previously unselected line defined in the sketch model is selected (process action 1600). As indicated in process action 1602, the line type is determined next, i.e., whether it is of the type that is to always appears in a sketch (referred to as Type I in FIG. 16A), sometimes appears in a sketch (referred to as Type II in FIG. 16A), or appears only if another line or lines are also present or absent in a sketch (referred to as Type III in FIG. 16A). If it is determined that the line is of the type that always appears (Type I), a previously unselected pixel location that would be associated with the line is selected (process action 1604). The pixel in the expected sketch image that best matches the selected pixel location is identified next (process action 1606). Any appropriate matching process can be employed. For example, it is very efficient to directly sample from P(S'), and then follow with a local search. Thus, the matching process can be accomplished in the same way as described previously in connection with the comparison of the transformed input image to each of the transformed training images. Once the best match location is found, the location of the selected pixel of the selected sketch model line is modified to coincide with the location of the identified "best match" pixel in the expected sketch image (process action 1608). It is then determined if there are any remaining pixels associated with the selected line that have not been selected (process action 1610). If so, process actions 1604 through 1610 are repeated.

If it is determined in process action 1602 that the selected line is of the type designated in the sketch model as sometimes appearing (Type II), then the same process described above is attempted (i.e., process actions 1604 through 1610), with the exception that at the end of the aforementioned comparison and search actions, it is determined if the best match pixels have a sufficient likelihood associated with them to ensure that the line actually should appear in the sketch (process action 1612). One way of accomplishing this task is to employ a likelihood threshold, which when exceeded indicates that the line should be included. The exact value of this threshold would depend on the application, but can be readily established given knowledge of the training data used to produce the sketch model. If the line cannot be satisfactorily fit to the expected sketch model, it is eliminated in the sketch being generated from the sketch model (process action 1614). Specifically, its on-off switch is set to "off" in the aforementioned representation of the line defined by an on-off switch, its width and a plurality of control point locations.

If it is determined in process action 1602 that the selected line is of the type whose inclusion in the sketch hinges on the presence or absence of another line or lines, then it is first determined in process action 1616 whether the conditions for inclusion are met (i.e., whether the prescribed line(s) are present or absent, as the case may be). If the inclusion conditions are met, then the same comparison and search process described above is performed (i.e., process actions 1604 through 1610). If, however, the inclusion conditions are not met, then the line is eliminated in the sketch being generated from the sketch model (process action 1618). Specifically, its on-off switch is set to "off".

In addition, it is noted that the action (i.e., process action 1612) involving determining whether the best match pixels have a sufficient likelihood associated with them to ensure that the line actually should appear in the sketch could optionally be applied to the aforementioned lines that always appear or to lines whose appearance has been decided because certain inclusion conditions have been met. Granted, these lines should be present in the expected sketch. However, this optional action could prevent misplacement of lines in the generated sketch where the actual locations of the lines in the expected sketch image have been masked by noise. This optional action has been included in the process outlined in FIG. 16B. Thus, if a Type I or Type III line cannot be satisfactorily fit to the expected sketch image, it is eliminated in the sketch being generated from the sketch model (process action 1614), just as in the case of Type II lines. If, however, it is found for any of the line types that it can be satisfactorily fit to the expected sketch image, then it is included in the sketch (process action 1620). To this end, the switch element partially defining each line that is to be included in the sketch being generated is set to the "on" condition.

It is next determined if any previously unselected lines of the sketch model remain (process action 1622). If so, then process actions 1600 through 1622 are repeated as appropriate. If no previously unselected lines remain, the process ends.

2.3 The Final Sketch

The result of the best fit procedure described above is a transformed version of a sketch of the face of the person depicted in the input image. The sketch is transformed in that it is produced from a transformed version of the input image. Thus, the procedure in generating a final sketch $S_{in}$ according to the present invention is to eliminate the effects of the warping performed previously to create the transformed input image $S_{in}'$. Referring again to FIG. 9, this is accomplished by applying the inverse of the previously-computed geometric transform function $G_{in}^{-1}$ to the transformed sketch $S_{in}'$ (process action 910). Thus, $S_{in} = G_{in}^{-1}(S_{in}')$. In this way, each pixel in the transformed sketch is reassigned to a location matching that of its corresponding pixel the original input image. The result is a sketch of the face of the person depicted in the input image that exhibits the stylistic characteristics of the sketch artist who created the training sketches.

It is noted that in the tested embodiments of the present invention, the feature points labeled in the training images and those identified via the ASM module in the runtime phase corresponded to features of the depicted person's face only. The subject's hair and ears were excluded. While this need not be the case, it does simplify the processing required to produce a sketch from an input image. When the hair and ears are not modeled, they can be added once the sketch of the face is generated, as indicated in FIG. 9, by using conventional edge detection methods on the input image to identify the outline of these features (process action 912). Lines representing the outline of the hair and ears are then added to the sketch (process action 914) to end the sketch generation process. These last two actions are optional and performed only if the hair and ears were not modeled.

Figure 17:
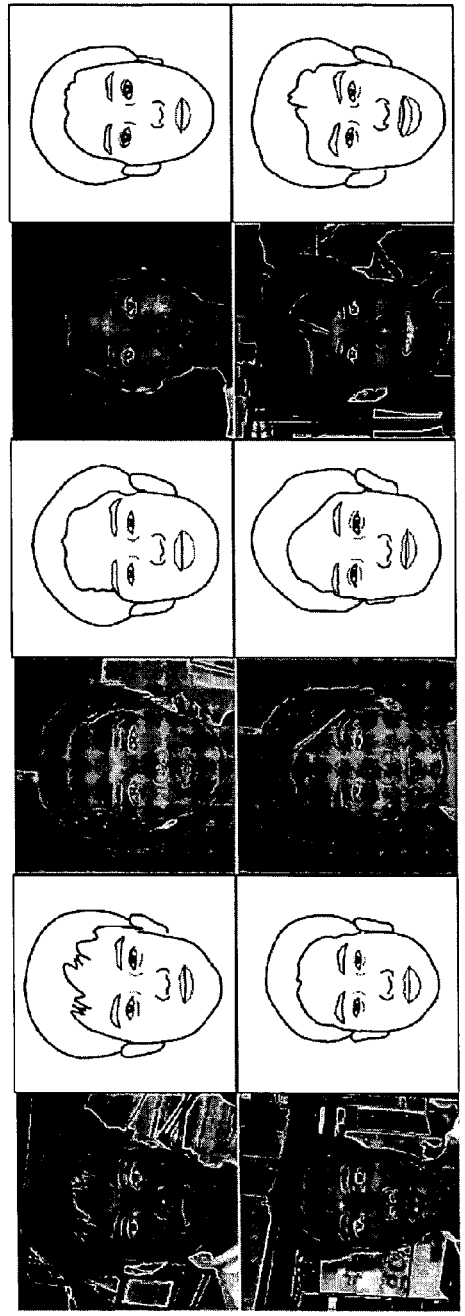
FIG. 17 is an image depicting a series of input images and the sketches generated therefrom.
Figure 18A:
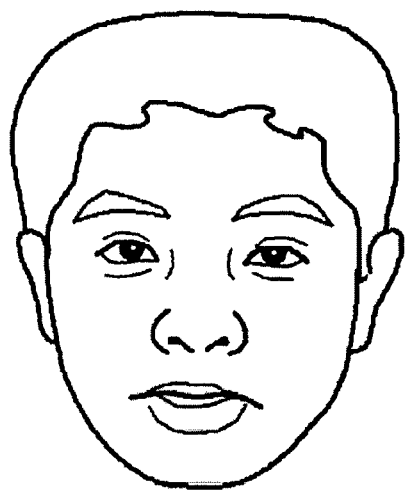
FIGS. 18A–D are images depicting two examples of sketches generated in accordance with the present invention and blown-up views of the right eye and nose regions of these sketches.
Figure 18C:
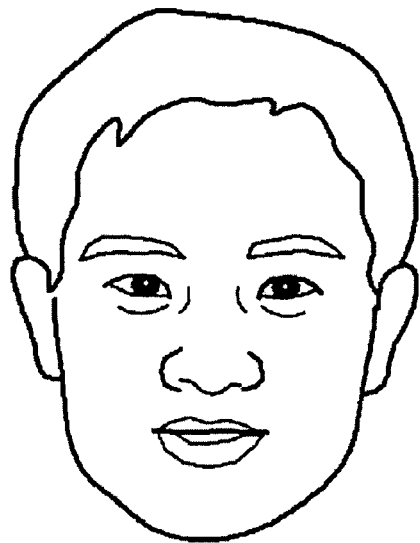
Figure 18B:
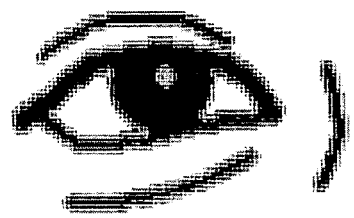
Figure 18D:
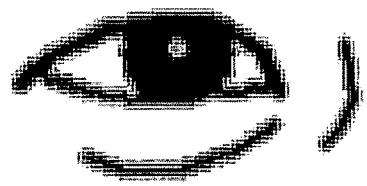

FIG. 17 shows a series of input images and the resulting sketches generated using the above-described sketch generation system and process. The depicted examples demonstrate the richness of generated sketches. This richness is partially achieved using the line classification scheme described above in connection with the creation of the transformed sketch. The effect of this classification scheme is illustrated in the sketch depicted in FIGS. 18A and C, and particularly in the close-up views of these sketches shown in FIGS. 18B and D. Specifically, FIGS. 18A and C show two examples of sketches synthesized according to the present invention. FIGS. 18B and D show more detailed views of the right eyes and noses forming part of the sketches of FIGS. 18A and C, respectively. These close-up views illustrate that some lines can appear or disappear in different sketches depending on the line classifications. For example, a line above the eye appears in FIG. 18B, but not in 18D. In addition, FIGS. 18B and D illustrate that different lines can be used to represent the same feature depending on which lines best fit the features depicted in the expected sketch image. For example, the bottom of the nose of the sketched face in FIG. 18B is made up of two separate, disconnected lines, while the similar feature in FIG. 18D is represented by a single line.

2.4 Runtime Phase Summary

Referring once again to FIG. 8, the foregoing runtime phase of the sketch generation process can be summarized pictorially as follows. First, an image $I_{in}$ 820 is input. The ASM module 808 is then used to identify facial feature points in the input image 820. Image 822 shows the identified feature points as white dots. A geometric transform function $G_{in}$ is then defined for the input image using the MeanShape vector 810 as follows: MeanShape=$G_{in}$(Shape$_{in}$), where Shape$_{in}$ is the shape vector formed from the labeled facial feature points associated with the input image 820. The geometric transform function $G_{in}$ is used to warp the input image 820 into a transformed input image $I_{in}'$ 824, i.e., $I_{in}'=G_{in}(I_{in})$. A nonparametric sampling module 826 is employed to obtain an "expected sketch image" (T') 828 from the transformed input image 824 and the previously-transformed training images 812 and sketches 814. Next, the sketch model P(S') 818 is fit to the expected sketch image 828 to obtain a geometrically transformed sketch $S_{in}'$ 830 of the input image 820. The final sketch $S_{in}$ 832 is then computed from the inverse of the previously-derived input image geometric transformation function: $S_{in}=G_{in}^{-1}(S_{in}')$.

3.0 References

[1] S. Brennan. Caricature generator. Master's thesis, Cambridge, MIT, 1982.

[2] M. Tominaga, S. Fukuoka, K. Murakami, and H. Koshimizu. Facial caricaturing with motion caricaturing in Picasso system. In *IEEE/ASME International Conference on Advanced Intelligent Mechatronics*, page 30, 1997.

[3] H. Koshimizu, M. Tominaga, T. Fujiwara, and K. Murakami. On kansei facial processing for computerized facial caricaturing system Picasso. In *IEEE International Conference on Systems, Man, and Cybernetics*, volume 6, pages 294–299, 1999.

[4] Y. Li and H. Kobatake. Extraction of facial sketch based on morphological processing. In *IEEE international conference on image processing*, volume 3, pages 316–319, 1997.

[5] S. E. Librande. Example-based character drawing. Master's thesis, Cambridge. MA. MIT, 1992.

[6] W. T. Freeman, J. B. Tenenbaum, and E. Pasztor. An example-based approach to style translation for line drawings. Technical Report 11, MERL Technical Report, Cambridge, Mass., February 1999.

[7] T. F. Cootes and C. J. Taylor. Statistical models of appearance for computer version. Technical report, University of Manchester, Manchester M13 9PT, U.K., 2000.

The invention claimed is:

1. A computer-implemented process for generating a sketch of a person's face from an image of the person's face, comprising:

a training step comprising, an inputting step for inputting a set of training images each of which depicts a person's face, a drawing step for drawing a set of training sketches each representing a respective face depicted in the training images, an identifying step for identifying a prescribed set of points in each training image, said points marking the contours of a prescribed set of facial features, a teaching step for teaching an active shape model module using the identified feature points to automatically locate said prescribed set of points in an arbitrary image of a person's face, a computing step for computing a meanshape vector by forming a separate shape vector for each training image from the identified feature points of that image and averaging the corresponding elements of each shape vector, wherein each shape vector has identically ordered elements, a defining step for defining a geometric transform function for each training image which warps that image so that the identified feature points in vectorized form equals the meanshape vector, a warping step for warping each training image and its corresponding sketch using the geometric transform function associated with the training image to create transformed versions thereof, and a second defining step for defining a sketch model comprising a set of lines representative of the lines found in the transformed training sketches; and a sketch generating step comprising, a second inputting step for inputting an image of a person's face, an employing step for employing the active shape model to locate said prescribed set of facial feature points in the input image, a third defining step for defining a geometric transform function for the input image which warps the input image so the located feature points thereof in vectorized form equals the meanshape vector, a second warping step for warping the input image using the geometric transform function associated with the input image to create a transformed input image, a creating step for employing a non-parametric sampling module to create an expected sketch image from the transformed input image as well as the transformed training images and sketches, a fitting step for fitting the lines defined in the sketch model to the expected sketch image to create a transformed input image sketch comprising those lines of the sketch model that correspond to facial features found in the expected sketch image, and an applying step for applying an inverse of the input image geometric transform function to the transformed input image sketch to unwarp the sketch such that the shape and location of the lines making up the sketch match the shape and location of corresponding facial features in the input image.

2. The process of claim 1, wherein the creating step for creating an expected sketch image, comprises:

an ascertaining step for ascertaining the value of a prescribed pixel characteristic of the pixel under consideration and those of other pixels in a prescribed neighborhood surrounding the pixel under consideration;

for each of the transformed training images, a second identifying step for identify the pixels in a prescribed search block in the transformed training image under consideration which is centered on the pixel corresponding in location to the transformed input image pixel currently under consideration, for each pixel identified as being in the search block, a second ascertaining step for ascertaining the value of the prescribed pixel characteristic of each of the pixels in a neighborhood of pixels centered on the search block pixel under consideration, wherein the neighborhood of pixels in the transformed training image is of the same size as the prescribed pixel neighborhood associated with the transformed input image, a second computing step for computing the difference in the prescribed pixel characteristic values between each pixel in the neighborhood associated with the transformed input image pixel under consideration and the correspondingly situated pixels of the neighborhood of pixels centered on the search block pixel under consideration in the transformed training image currently under consideration, and an averaging step for averaging the computed differences and designate the average difference a candidate for the overall difference associated with the transformed input image pixel under consideration, and a third identifying step for identifying the smallest candidate overall average difference and designate the search block pixel associated with smallest candidate average difference as the pixel of the transformed training image currently under consideration that best matches the transformed input image pixel currently under consideration;

for each pixel designated to be the best matching, a third computing step for computing a value indicative of the likelihood that the designated best matching pixel actually corresponds to the transformed input image pixel currently under consideration based on the distance separating the location of the designated best matching pixel in the transformed training image under consideration and the location of the transformed input image pixel currently under consideration relative to the separation distances computed between the designated best matching pixels of other transformed training images and the transformed input image pixel currently under consideration, and a designating step for designating whether the pixel in the transformed training sketch associated with the best matching pixel under consideration has a pixel value indicative of a black pixel or a white pixel;

a fourth identifying step for identifying a prescribed number of the transformed training image pixels designated as best matching which exhibit the highest likelihood values that the best matching pixel actually corresponds to the transformed input image pixel currently under consideration;

a fourth computing step for computing a weighted average of the pixel values of the pixels in the transformed training sketches associated with the best matching pixels identified as exhibiting the highest likelihood values, wherein the weight associated with each transformed training sketch pixel value involved is based on the likelihood value assigned to the corresponding best matching pixels; and an assigning step for assigning the weighted average pixel value as the pixel value of a pixel in the expected sketch image corresponding in location to the transformed input image pixel currently under consideration.

3. The process of claim 1, wherein each line included in the sketch model is characterizing in terms comprising an on-off indicator used to indicate whether a line modeled in the sketch model is to appear in a sketch generated using the sketch model, the line's width, and a set of control points which define the shape and location of the line, and wherein the program module for fitting the lines defined in the sketch model to the expected sketch image, comprises sub-modules for:

a selecting step for selecting a previously unselected line defined in the sketch model;

a determining step for determining the line type of the currently selected line, wherein the selected line is one of (i) a first type that appears in every transformed training sketch, (ii) a second type that does not appear in every transformed training sketch, but which when appearing in one of the transformed training sketches does so independent of the presence or absence of other lines, or (iii) a third type that does not appear in every transformed training sketch, but which when appearing in one of the transformed training sketches does so only when one or more other lines are also present or absent;

whenever it is determined that the selected line is of the first type, for each pixel location associated with the line as it would appear in a sketch, a second identifying step for identifying the pixel in the expected sketch image that best matches a prescribed pixel characteristic of the pixel location under consideration and which resides in the vicinity of a location corresponding to that of the line pixel, and a re-assigning step for reassigning the location of the line pixel under consideration to match that of the expected sketch image pixel that best matches the selected pixel, and a characterizing step for characterizing the resulting line with reassigned pixel locations in terms comprising an on-off indicator that is set to the on mode, the line's width, and a set of control points which define the shape and location of the line as reflected by the reassigned pixel locations;

whenever it is determined that the selected line is of the second type, a second determining step for determining whether the facial feature represented by the line appears in the expected sketch image, whenever the facial feature appears in the expected sketch image, for each pixel location associated with the line as it would appear in a sketch, a third identifying step for identifying the pixel in the expected sketch image that best matches a prescribed pixel characteristic of the pixel location under consideration and which resides in the vicinity of a location corresponding to that of the line pixel, and a second re-assigning step for reassigning the location of the line pixel under consideration to match that of the expected sketch image pixel that best matches the selected pixel, and a second characterizing step for characterizing the resulting line with reassigned pixel locations in terms comprising an on-off indicator that is set to the on mode, the line's width, and a set of control points which define the shape and location of the line as reflected by the reassigned pixel locations, and whenever the facial feature does not appear in the expected sketch image, a third characterizing step for characterizing the line in terms comprising an on-off indicator that is set to the off mode; and whenever it is determined that the selected line is of the third type, a third determining step for determining whether the facial features represented by those lines upon which the inclusion of the line under consideration depends are present or absent, whenever the lines upon which the inclusion of the line under consideration depends are not present or absent, a third characterizing step of characterizing the line in terms comprising an on-off indicator that is set to the off mode, whenever the lines upon which the inclusion of the line under consideration depends are present or absent, for each pixel location associated with the line as it would appear in a sketch, a fourth identifying step for identifying the pixel in the expected sketch image that best matches a prescribed pixel characteristic of the pixel location under consideration and which resides in the vicinity of a location corresponding to that of the line pixel, and a third reassigning step for reassigning the location of the line pixel under consideration to match that of the expected sketch image pixel that best matches the selected pixel, and a fourth characterizing step for characterizing the resulting line with reassigned pixel locations in terms comprising an on-off indicator that is set to the on mode, the line's width, and a set of control points which define the shape and location of the line as reflected by the reassigned pixel locations.

4. A computer-implemented process for training a computer using a set of training images each of which depicts a person's face to generate a sketch of a person's face from an image of that person's face, said computer-executable instructions comprising:

a drawing step for drawing a training sketch of the face of each person depicted in a training image, each of said training sketches comprising a plurality of lines that represent and correspond in location to facial features of the person depicted in the associated training image;

a defining step for defining an average face shape which represents the average shape and location of a prescribed set of facial features depicted in the training images;

a warping step for warping each training image and its corresponding sketch so as to conform them to the average face shape, thereby creating a set of transformed training images and a corresponding set of transformed training sketches;

a training step for training an active shape model using the training images to automatically identify the shape and location of said prescribed set of facial features in an arbitrary image depicting a person's face; and a second defining step for defining a sketch model comprising a set of lines representative of the lines found in the transformed training sketches.

5. The process of claim 4, further comprising a generating step for generating a sketch of a person's face from an image of that person's face, comprising:

an employing step employing the active shape model to identify the shape and location of said prescribed set of facial features in the input image;

a third defining step for defining a geometric transform function for the input image which when applied to the input image warps the image so that said prescribed set of facial features correspond in shape and location to the average face shape;

an applying step for applying the input image geometric transform function to warp the input image to create a transformed version thereof;

a creating step for creating an expected sketch image using non-parametric sampling from the transformed input image as well as the transformed training images and sketches;

a fitting step for fitting the lines defined in the sketch model to the expected sketch image to create a transformed input image sketch comprising those lines of the sketch model that correspond to facial features found in the expected sketch image; and a second applying step for applying an inverse of the input image geometric transform function to the transformed input image sketch to unwarp the sketch such that the shape and location of the lines making up the sketch match the shape and location of corresponding facial features in the input image.

6. The process of claim 5, wherein each line included in the sketch model is characterizing in terms comprising an on-off indicator used to indicate whether a line modeled in the sketch model is to appear in a sketch generated using the sketch model, the line's width, and a set of control points which define the shape and location of the line, and wherein the fitting step for fitting the lines defined in the sketch model to the expected sketch image, comprises:

a selecting step for selecting a previously unselected line defined in the sketch model;

a determining step for determining the line type of the currently selected line, wherein the selected line is one of (i) a first type that appears in every transformed training sketch, (ii) a second type that does not appear in every transformed training sketch, but which when appearing in one of the transformed training sketches does so independent of the presence or absence of other lines, or (iii) a third type that does not appear in every transformed training sketch, but which when appearing in one of the transformed training sketches does so only when one or more other lines are also present or absent;

whenever it is determined that the selected line is of the first type, a second determining step for determining whether the facial feature represented by the line appears in the expected sketch image, whenever the facial feature appears in the expected sketch image, for each pixel location associated with the line as it would appear in a sketch, an identifying step for identifying the pixel in the expected sketch image that best matches a prescribed pixel characteristic of the pixel location under consideration and which resides in the vicinity of a location corresponding to that of the line pixel, and a reassigning step for reassigning the location of the line pixel under consideration to match that of the expected sketch image pixel that best matches the selected pixel, and a characterizing step for characterizing the resulting line with reassigned pixel locations in terms comprising an on-off indicator that is set to the on mode, the line's width, and a set of control points which define the shape and location of the line as reflected by the reassigned pixel locations, whenever the facial feature does not appear in the expected sketch image, a second characterizing step for characterizing the line in terms comprising an on-off indicator that is set to the off mode; and whenever it is determined that the selected line is of the second type, a third determining step for determining whether the facial feature represented by the line appears in the expected sketch image, whenever the facial feature appears in the expected sketch image, for each pixel location associated with the line as it would appear in a sketch, a second identifying step for identifying the pixel in the expected sketch image that best matches a prescribed pixel characteristic of the pixel location under consideration and which resides in the vicinity of a location corresponding to that of the line pixel, and a second reassigning step for reassigning the location of the line pixel under consideration to match that of the expected sketch image pixel that best matches the selected pixel, and a third characterizing step for characterizing the resulting line with reassigned pixel locations in terms comprising an on-off indicator that is set to the on mode, the line's width, and a set of control points which define the shape and location of the line as reflected by the reassigned pixel locations, and whenever the facial feature does not appear in the expected sketch image, a fourth characterizing step for characterizing the line in terms comprising an on-off indicator that is set to the off mode; and whenever it is determined that the selected line is of the third type, a fourth determining step for determining whether the facial features represented by those lines upon which the inclusion of the line under consideration depends are present or absent as indicated, whenever the lines upon which the inclusion of the line under consideration depends are not present or absent as indicated, a fifth characterizing step for characterizing the line in terms comprising an on-off indicator that is set to the off mode, whenever the lines upon which the inclusion of the line under consideration depends are present or absent as indicated, a fifth determining step for determining whether the facial feature represented by the line appears in the expected sketch image, whenever the facial feature appears in the expected sketch image, for each pixel location associated with the line as it would appear in a sketch, a third identifying step for identifying the pixel in the expected sketch image that best matches a prescribed pixel characteristic of the pixel location under consideration and which resides in the vicinity of a location corresponding to that of the line pixel, and a third reassigning step for reassigning the location of the line pixel under consideration to match that of the expected sketch image pixel that best matches the selected pixel, and a sixth characterizing step for characterizing the resulting line with reassigned pixel locations in terms comprising an on-off indicator that is set to the on mode, the line's width, and a set of control points which define the shape and location of the line as reflected by the reassigned pixel locations, and whenever the facial feature does not appear in the expected sketch image, a seventh characterizing step for characterizing the line in terms comprising an on-off indicator that is set to the off mode.

* * * * *